(12) United States Patent
Iguchi et al.

(10) Patent No.: US 8,208,541 B2
(45) Date of Patent: Jun. 26, 2012

(54) MOTION ESTIMATION DEVICE, MOTION ESTIMATION METHOD, MOTION ESTIMATION INTEGRATED CIRCUIT, AND PICTURE CODING DEVICE

(75) Inventors: Masayasu Iguchi, Hyogo (JP); Tatsuro Juri, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 1451 days.

(21) Appl. No.: 11/695,145

(22) Filed: Apr. 2, 2007

(65) Prior Publication Data
US 2007/0230573 A1 Oct. 4, 2007

(30) Foreign Application Priority Data
Apr. 3, 2006 (JP) ................. 2006-102563

(51) Int. Cl.
H04N 7/12 (2006.01)
(52) U.S. Cl. .............. 375/240.12; 375/240.16
(58) Field of Classification Search . 375/240.12–240.16
See application file for complete search history.

(56) References Cited

U.S. PATENT DOCUMENTS

| | | | | |
|---|---|---|---|---|
| 6,118,821 A * | 9/2000 | Matsumoto et al. | ..... | 375/240.25 |
| 6,195,389 B1 * | 2/2001 | Rodriguez et al. | ....... | 375/240.16 |
| 7,881,376 B2 * | 2/2011 | Iguchi et al. | ............. | 375/240.12 |
| 7,894,526 B2 * | 2/2011 | Kadono et al. | ............ | 375/240.16 |
| 8,107,748 B2 * | 1/2012 | Miao et al. | .................... | 382/236 |
| 2003/0231711 A1 * | 12/2003 | Zhang et al. | ............. | 375/240.16 |
| 2004/0114688 A1 * | 6/2004 | Kang | ....................... | 375/240.12 |
| 2004/0213468 A1 * | 10/2004 | Lee et al. | ...................... | 382/236 |
| 2005/0190844 A1 * | 9/2005 | Kadono et al. | ........... | 375/240.16 |
| 2005/0226332 A1 * | 10/2005 | Uetani | ..................... | 375/240.16 |
| 2005/0254581 A1 * | 11/2005 | Iguchi et al. | ............. | 375/240.12 |
| 2006/0023792 A1 | 2/2006 | Cho et al. | | |
| 2006/0062302 A1 * | 3/2006 | Yin et al. | ................. | 375/240.16 |
| 2007/0030899 A1 | 2/2007 | Iguchi et al. | | |

(Continued)

FOREIGN PATENT DOCUMENTS
JP 5-260461 10/1993
(Continued)

OTHER PUBLICATIONS

Partial English translation of Claim 1, 3 and 4, Paragraph [0010] and [0011], Fig. 1 and 2 of JP 2004-72301.

(Continued)

Primary Examiner — Eleni Shiferaw
Assistant Examiner — Phy Anh Vu
(74) Attorney, Agent, or Firm — Greenblum & Bernstein, P.L.C.

(57) ABSTRACT

Provided is a motion estimation device in which an amount of pixel data transferred from an external frame memory to an internal reference local memory is reduced. By the motion estimation device, it is possible to reduce a memory capacity and a size or processing of a circuit controlling the pixel transfer. In a reference memory control unit and an internal reference memory, a height of a area to be updated is set to L pixels, where L is power of 2, a logical address segments, whose size is suitable for address calculation, are allocated to picture space, and FIFO management is performs. In another application, an assistance memory is added, and another element other than the assistance memory performs the FIFO management for rectangular areas in an image of a conventional width. As a result, the address calculation is simplified, which makes it possible to reduce an embedded circuit for the reference memory control unit and the internal reference memory.

16 Claims, 27 Drawing Sheets

U.S. PATENT DOCUMENTS

2011/0122952 A1 * 5/2011 Esaki et al. ............ 375/240.16

FOREIGN PATENT DOCUMENTS

| JP | 9-284773 | 10/1997 |
| JP | 2963269 | 8/1999 |
| JP | 11-308617 | 11/1999 |
| JP | 2002-152756 | 5/2002 |
| JP | 2004 072301 | 3/2004 |
| JP | 2004-072301 | 3/2004 |
| JP | 2004-72301 | 3/2004 |
| JP | 2006-042364 | 2/2006 |
| JP | 2006-287583 | 10/2006 |
| WO | 2006 103984 | 10/2006 |

OTHER PUBLICATIONS

Japan Office action, mail date is Oct. 26, 2010.
English language Abstract of corresponding JP 5-260461.
English language Abstract of JP 2004-072301.
"ITU (International Telecommunication Union)-T H.264", Mar. 2005, Series H: Audiovisual and Multimedia Systems Infrastructure of audiovisual services—Coding of moving video, Advanced video coding for generic audiovisual services pp. 1-324.
English language Abstract of WO2006/103984.

* cited by examiner

PRIOR ART

PRIOR ART

PRIOR ART

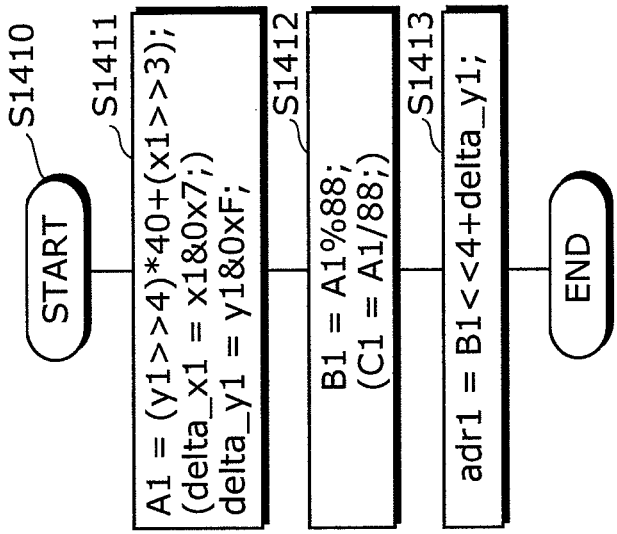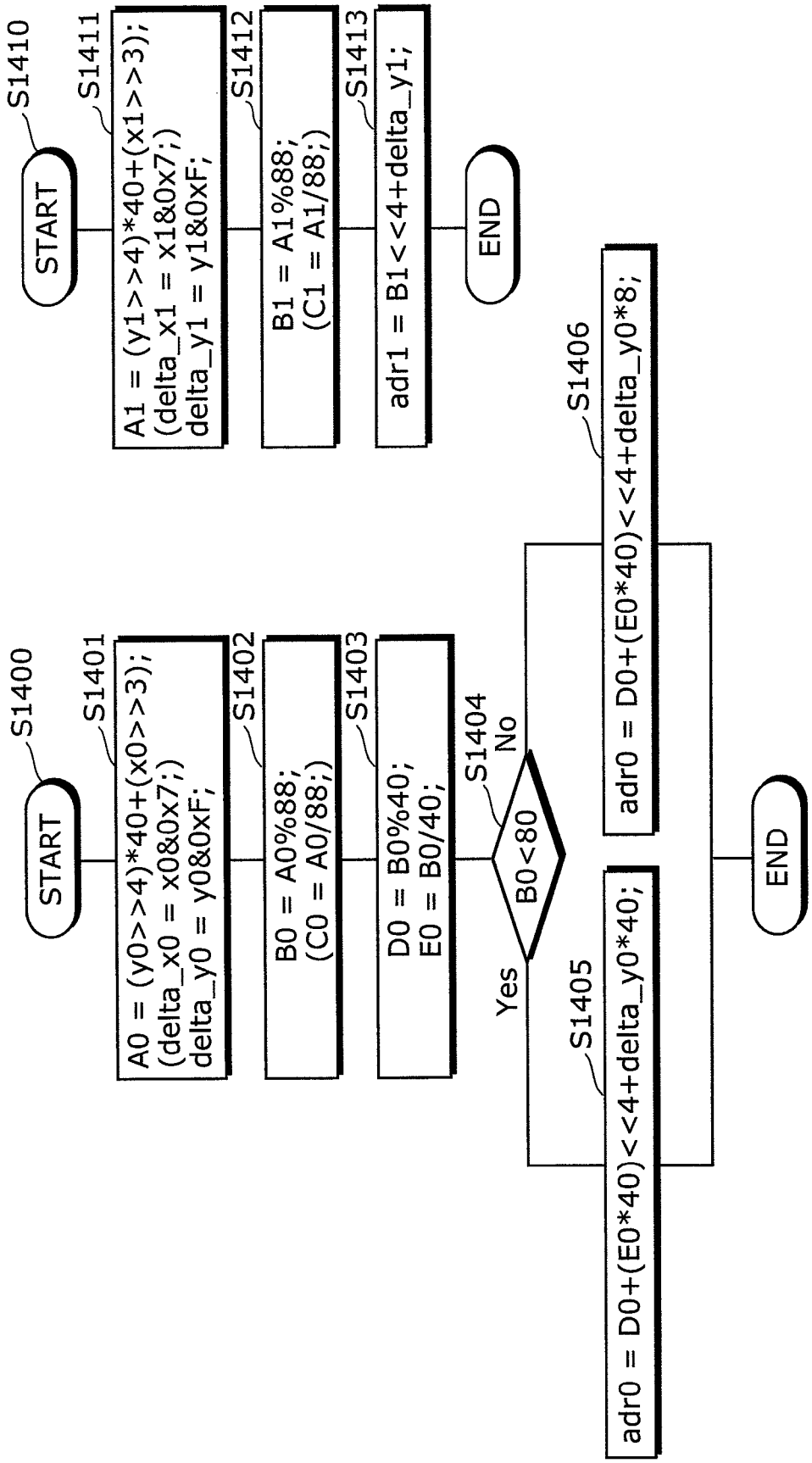

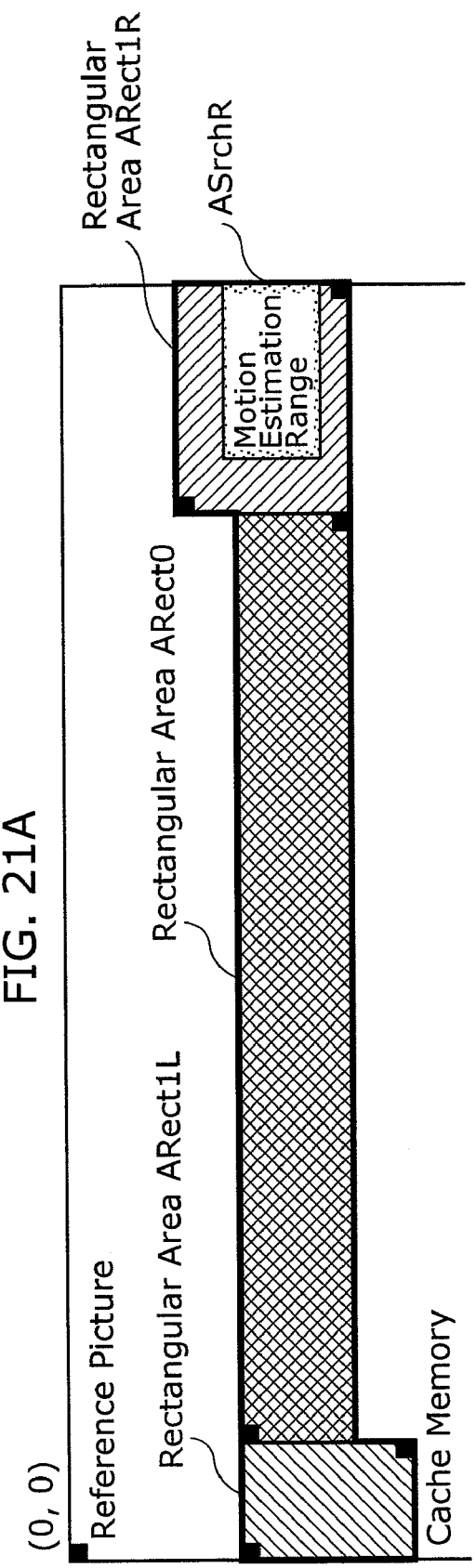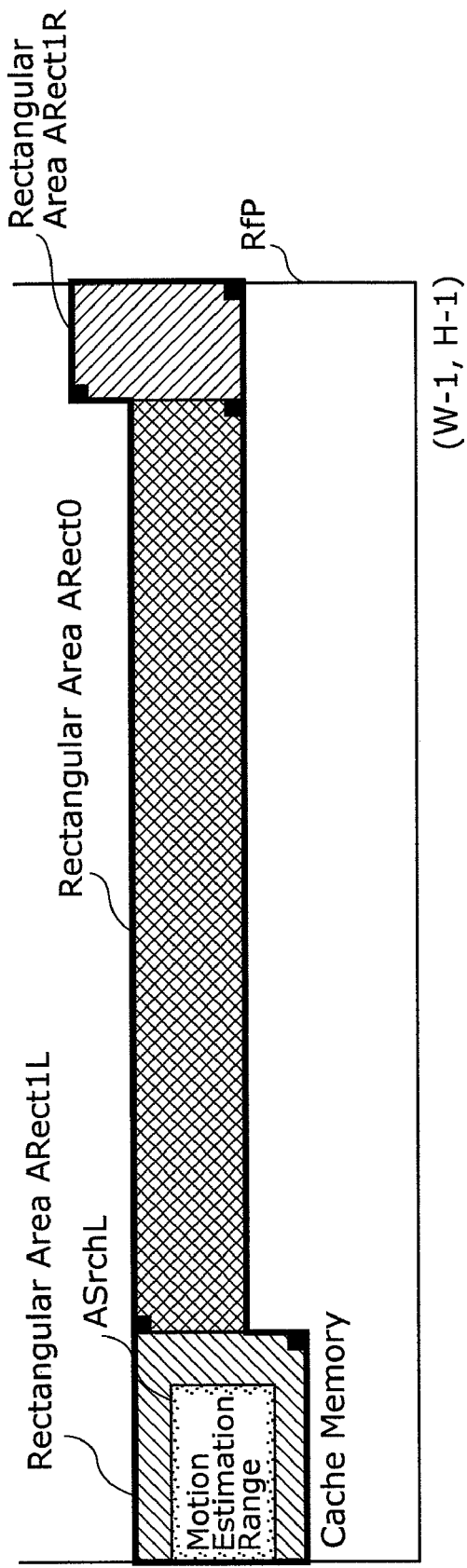
FIG. 21A
FIG. 21B

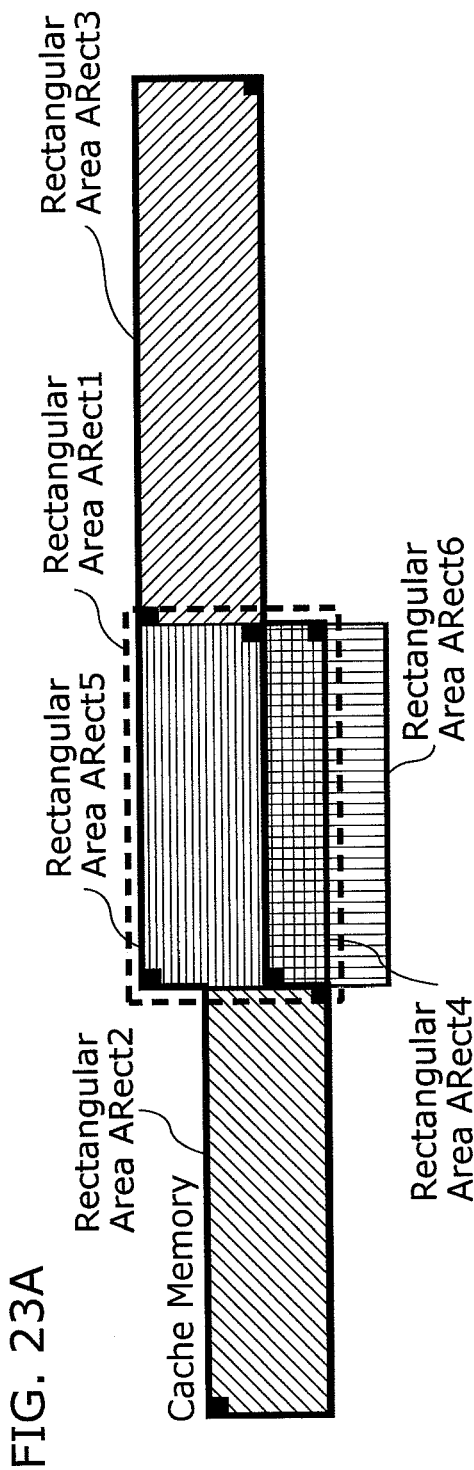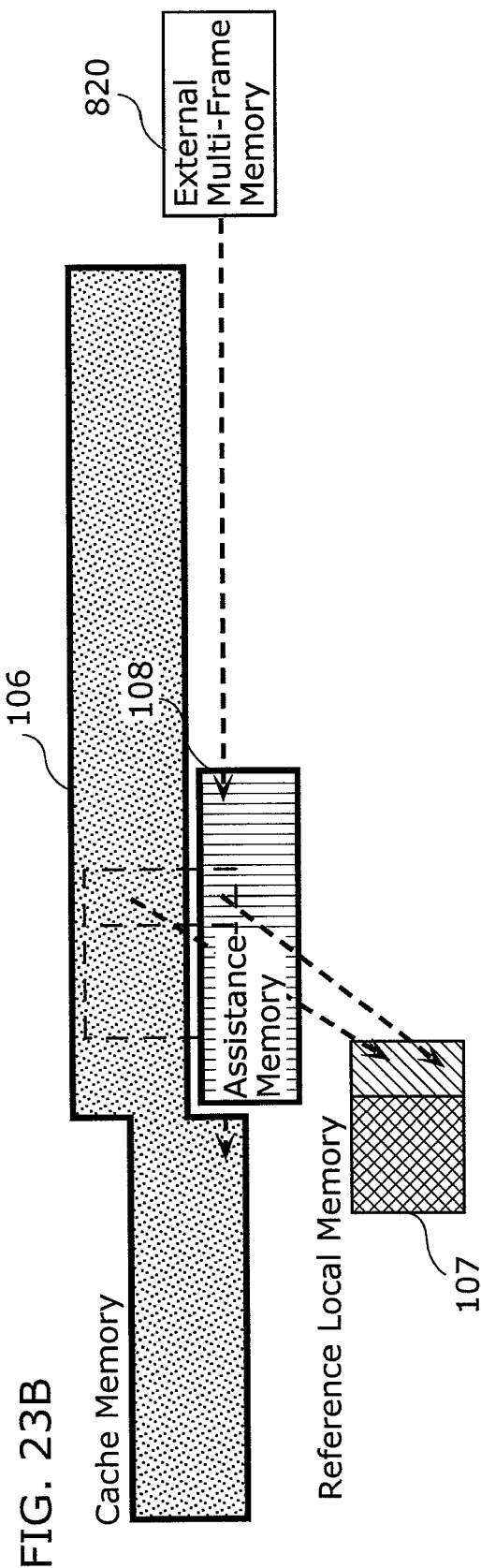

MOTION ESTIMATION DEVICE, MOTION ESTIMATION METHOD, MOTION ESTIMATION INTEGRATED CIRCUIT, AND PICTURE CODING DEVICE

BACKGROUND OF THE INVENTION (1) Field of the Invention

The present invention relates to a motion estimation device, a motion estimation method, a motion estimation integrated circuit, and a picture coding device, which perform motion estimation for blocks in a picture.

(2) Description of the Related Art

Recently, with the arrival of the age of multimedia in which audio, video and other pixel values are integrally handled, existing information media, i.e., newspapers, journals, TVs, radios and telephones and other means through which information is conveyed to people has come under the scope of multimedia. Generally speaking, multimedia refers to something that is represented by associating not only characters but also graphics, audio and especially images and the like together. However, in order to include the aforementioned existing information media in the scope of multimedia, it appears as a prerequisite to represent such information in digital form.

However, when estimating the amount of information contained in each of the aforementioned information media as the amount of digital information, the information amount per character requires 1 to 2 bytes whereas the audio requires more than 64 Kbits (telephone quality) per second, and when it comes to the moving picture, it requires more than 100 Mbits (present television reception quality) per second. Therefore, it is not realistic for the information media to handle such an enormous amount of information as it is in digital form. For example, although video phones are already in the actual use via Integrated Services Digital Network (ISDN) which offers a transmission speed of 64 Kbit/s to 1.5 Mbit/s, it is impossible to transmit images on televisions and images taken by cameras directly through ISDN.

This therefore requires information compression techniques, and for instance, in the case of the videophone, video compression techniques compliant with H.261 and H.263 standards recommended by International Telecommunication Union-Telecommunication Standardization Sector (ITU-T) are employed. According to the information compression techniques compliant with the MPEG-1 standard, image information as well as audio information can be stored in an ordinary music Compact Disc (CD).

Here, Moving Picture Experts Group (MPEG) is an international standard for compression of moving picture signals standardized by International Standards Organization/International Electrotechnical Commission (ISO/IEC), and MPEG-1 is a standard to compress moving picture signals down to 1.5 Mbps, that is, to compress information of TV signals approximately down to a hundredth. The transmission rate within the scope of the MPEG-1 standard is set to about 1.5 Mbps to achieve the middle-quality picture, therefore, MPEG-2 which was standardized with the view to meet the requirements of high-quality picture allows data transmission of moving picture signals at a rate of 2~15 Mbps to achieve the quality of TV broadcasting. In the present circumstances, a working group (ISO/IEC JTC1/SC29/WG11) in the charge of the standardization of the MPEG-1 and the MPEG-2 has achieved a compression rate which goes beyond what the MPEG-1 and the MPEG-2 have achieved, further enabled coding/decoding operations on a per-object basis and standardized MPEG-4 in order to realize a new function required by the era of multimedia. In the process of the standardization of the MPEG-4, the standardization of coding method for a low bit rate was aimed. However, the aim is presently extended to a more versatile coding of moving pictures at a high bit rate including interlaced pictures.

Furthermore, MPEG-4 AVC and H.264 have been standardized since 2003 as a picture coding method with higher compression rate, which are jointly worked by the ISO/IEC and the ITU-T. Currently, regarding H.264, a draft of its revised standard in compliance with a High Profile which is suited for High Definition (HD) pictures have been developed. As an application in compliance with H.264 standard, it is expected, as in the cases of the MPEG-2 and MPEG-4, that the application extends to digital broadcast, a Digital Versatile Disk (DVD) player/recorder, a hard disc player/recorder, a camcorder, a video phone and the like.

In general, in coding of a moving picture, the amount of information is compressed by reducing redundancy in temporal and spatial directions. Therefore, an inter-picture prediction coding, which aims at reducing the temporal redundancy, estimates a motion and generates a predictive picture on a block-by-block basis with reference to prior and/or subsequent pictures, and then codes a differential value between the obtained predictive picture and a current picture to be coded. Here, "picture" is a term to represent a single screen and it represents a frame when used for a progressive picture whereas it represents a frame or fields when used for an interlaced picture. The interlaced picture here is a picture in which a single frame consists of two fields respectively having different time. For encoding and decoding an interlaced picture, a single frame can be processed either as a frame, as two fields or as a frame/field structure depending on a block in the frame.

A picture to which an intra-picture prediction coding is performed without reference pictures is referred to as an "I-picture". A picture to which the inter-picture prediction coding is performed with reference to a single picture is referred to as a "P-picture". A picture to which the inter-picture prediction coding is performed by referring simultaneously to two pictures is referred to as a "B-picture". The B-picture can refer to two pictures, selected from the pictures whose display time is either forward or backward to that of a current picture to be coded, as an arbitrary combination. Whereas the reference pictures can be specified for each macroblock that is a fundamental unit of coding, they are distinguished as a first reference picture and a second reference picture. Here, the first reference picture is a first reference picture to be described firstly in a coded bit stream and the second reference picture is a reference picture to be described after the first reference picture in the coded bit stream. However, the reference pictures need to be already coded as a condition to code these I-picture, P-picture, and B-picture.

A motion compensation inter-picture prediction coding is used for coding the P-picture or the B-picture. The motion compensation inter-picture prediction coding is a coding method which adopts motion compensation to an inter-picture prediction coding. The motion compensation is a method of reducing the amount of data while increasing prediction precision by estimating an amount of motion (this is referred to as a motion vector, hereinafter) of each part in a picture and performing prediction in consideration of the estimated amount of data, instead of simply predicting a picture from a pixel value of a reference frame. For example, the amount data is reduced by estimating a motion vector of a current picture to be coded and coding a predictive difference between a predicted value which is shifted as much as the estimated motion vector and the current picture. Since this method requires information about the motion vector at the time of decoding, the motion vector is also coded, and recorded or transmitted.

The motion vector is estimated on a macroblock basis. Specifically, a motion vector is estimated by fixing a macroblock (target block) of the current picture, moving a macroblock (reference block) of the reference picture within a range in which the reference block is referred by the target block (hereinafter, referred to as "motion estimation range"), and finding a position of the reference block which is approximate to the target block.

FIG. 1 is a block diagram which shows a structure of a conventional inter-picture prediction coding device.

This inter-picture prediction coding device 800 includes a motion estimation unit 801, a multi-frame memory 802, a subtractor 803, a subtractor 804, a motion compensation unit 805, a coding unit 806, an adder 807, a motion vector memory 808, and a motion vector prediction unit 809.

The motion estimation unit 801 compares a motion estimation reference pixel MEp outputted from the multi-frame memory 802 with an image signal Vin, and outputs a motion vector MV and a reference frame number RN. The reference frame number RN is an identification signal for identifying a reference picture to be selected from among plural reference pictures as a reference picture for a current picture to be coded. The motion vector MV is temporally stored in the motion vector memory 808, and then outputted as a neighboring motion vector PvMV. This neighboring motion vector PvMV is referred to for predicting a predictive motion vector PrMV by the motion vector prediction unit 809. The subtractor 804 subtracts the predictive motion vector PrMV from the motion vector MV, and outputs the difference as the motion vector predictive difference DMV.

On the other hand, the multi-frame memory 802 outputs a pixel indicated by the reference frame number RN and the motion vector MV as a motion compensation reference pixel MCp1, and the motion compensation unit 805 generates a reference pixel in sub-pixel precision and outputs a reference picture pixel MCp2. The subtractor 803 subtracts the reference picture pixel MCp2 from the image signal Vin, and outputs a picture predictive difference DP.

The coding unit 806 performs variable-length coding on the picture predictive difference DP, the motion vector predictive difference DMV, and the reference frame number RN, and outputs the coded stream Str. It should be noted that, upon coding, a decoded picture predictive difference RDP, which is a result of decoding the picture predictive difference DP, is simultaneously outputted. The decoded picture predictive difference RDP is obtained by superimposing the coded difference on the picture predictive difference DP, and is same as the inter-picture predictive difference which is obtained by which the inter-picture prediction decoding device 800 decodes the coded stream Str.

The adder 807 adds the decoded picture predictive difference RDP to the reference picture pixel MCp2, and stores the resultant into the multi-frame memory 802 as a decoded picture RP. However, for an effective use of the capacity of the multi-frame memory 802, an area of the picture stored in the multi-frame memory 802 is released when it is not necessary, and the decoded picture RP of the picture which is not necessary to be stored in the multi-frame memory 802 is not stored into the multi-frame memory 802.

FIG. 2 is a block diagram for explaining a conventional inter-picture prediction decoding device. Note that the same reference characters in FIG. 1 are assigned to the identical constituent elements in FIG. 2, so that the details of those elements are the same as described above.

The conventional inter-picture prediction decoding device 900 shown in FIG. 2 outputs a decoded image signal Vout by decoding the coded stream Str coded by the conventional inter-picture prediction coding device 800 shown in FIG. 1. The inter-picture prediction decoding device 900 includes a multi-frame memory 901, a motion compensation unit 902, an adder 903, an adder 904, a motion vector memory 905, a motion vector prediction unit 906, and a decoding unit 907.

The decoding unit 907 decodes the coded stream Str, and outputs a decoded picture predictive difference RDP, a motion vector predictive difference DMV, and a reference frame number RN. The adder 904 adds a predictive motion vector PrMV outputted from the motion vector prediction unit 906 and the motion vector predictive difference DMV, and decodes a motion vector MV.

The multi-frame memory 901 outputs a pixel indicated by the reference frame number RN and the motion vector MV as a motion compensation reference pixel MCp1. The motion compensation unit 902 generates a reference pixel with a sub-pixel precision and outputs a reference picture pixel MCp2. The adder 903 adds the decoded picture predictive difference RDP to the reference picture pixel MCp2, and stores the sum into the multi-frame memory 901 as a decoded picture RP (a decoded image signal Vout). However, for an effective use of the capacity of the multi-frame memory 901, an area of the picture stored in the multi-frame memory 901 is released when it is not necessary, and the decoded picture RP of a picture which is not necessary to be stored in the multi-frame memory 901 is not stored into the multi-frame memory 901. Accordingly, the decoded image signal Vout, that is the decoded picture RP, can be correctly decoded from the coded stream Str.

By the way, Japanese Patent No. 2963269, for example, suggests a structure in which the conventional inter-picture prediction coding device 800 shown in FIG. 1 is embedded into a Large Scale Integration (LSI). As disclosed in the patent, in the case where the inter-picture prediction coding device is embedded in an LSI or the like, the multi-frame memory 802 of the conventional inter-picture prediction coding device 800 shown in FIG. 1 is separated to (i) an external frame memory outside the LSI and (ii) a local memory inside the LSI to be directly accessed when the motion estimation unit 801 performs motion estimation for macroblocks.

FIG. 3 is a block diagram showing an example of a structure of the multi-frame memory 802, in which the inter-picture prediction coding device 800 is connected with an external frame memory. Note that the reference characters in FIG. 1 are assigned to the identical constituent elements of FIG. 3, so that the details of those elements are the same as described above. The multi-frame memory 802 has an external frame memory 820 and a reference local memory 811 which is embedded in a LSI. The external frame memory 820 is a memory which is connected to the LSI having the inter-picture prediction coding device. The reference local memory 811 is a memory inside the LSI and accessed directly by the motion estimation unit 801 for motion estimation for macroblocks. The LSI is a LSI having the inter-picture prediction coding device. In FIG. 3, the constituent elements in the LSI other than the reference local memory 811 and the motion estimation unit 801 are not shown.

In FIG. 3, when motion estimation is performed, a picture range to be applied with the motion estimation is firstly transferred from the external frame memory 820 to the reference local memory 811 via an external connection bus Bus1. Next, data is read out from the reference local memory 811 via an internal bus Bus2, and motion estimation is performed by the motion estimation unit 801. With such a structure, a memory capacity of the LSI can be reduced.

FIG. 4 is a schematic diagram showing how pixels in one reference picture are to be transferred. The upper diagram shows an entire reference picture stored in the external frame memory 820. The lower diagram shows an image area which is transferred from the external frame memory 820 to the reference local memory 811 to be used for motion estimation, and a further image area which is transferred for next motion estimation. Assuming that the motion estimation is applied to each macroblock (MB) of 16×16 pixels, FIG. 4 shows that, for motion estimation for macroblocks in one row, pixels of (vertical length of motion estimation range)×(horizontal width of one picture) are transferred to the reference local memory 811. FIG. 4 also shows that, for motion estimation for macroblocks in one picture, the above-calculated pixels× (the number of MBs in a column in the picture) are transferred to the reference local memory 811. In more detail, if the picture is a Standard Definition (SD) picture in MPEG-2 or the like of 720×480 pixels, 45×30 MBs, in which a motion estimation range has macroblocks shifting each single MB from a position of a target macroblock (in other words, the motion estimation range has one macroblock at a position of the target macroblock and eight neighbor macroblocks surrounding the position), then total (16+16×2)×720×30=1,036,800 pixels are transferred to the reference local memory 811 for motion estimation for one picture.

However, if a SD picture in H.264 is managed by the reference local memory 811, more pixels surrounding the position are required than the above conventional MPEG-2 case, since in H.264, a 6-tap filter is used for motion estimation with sub-pixel precision, which is disclosed, for example, in "Information technology—Coding of audio-visual objects—Part 10: Advanced video coding" ISO/IEC 14496-10, International Standard, 2004-10-01. The reason is explained in more detail below. In MPEG-2, a sub-pixel is created using 4 pixels surrounding a position of a sub-pixel-precision pixel. In the case of H.264 using the 6-tap filter, however, a sub-pixel is created using 36 pixels. Therefore, if the motion estimation is assumed to be performed in the same range in both of MPEG-2 and H.264, H.264 requires pixels in two above rows, two below rows, two left columns, two right columns, in addition to pixels used in MPEG-2. As a result, if the picture is a SD picture in H.264 or the like, in which a motion estimation range has macroblocks shifting each single MB from a position of a target macroblock, then total (16+16×2+4)×720×30=1,123,200 pixels are transferred to the reference local memory 811 for motion estimation for one picture.

Moreover, if the picture is a High Definition (HD) picture of 1920×1088 pixels, 120×68 macroblocks, and especially coded in H.264, the above-described pixel transfer amount for one picture is significantly increased, so that such a huge amount is not able to be transferred with a capacity of the external connection bus Bus1 shown in FIG. 3.

Examples of such a huge transfer amount are given below. Here, it is assumed that a HD picture of MPEG-2 is managed by the reference local memory 811. Under the assumption, since a HD picture has pixels about 6 times as many as pixels in a SD picture, a motion estimation range is vertically and horizontally 2.5 times larger than a range of a SD picture, for the sake of simplified explanation, and thereby the motion estimation range has pixels shifting vertically and horizontally with 40 pixels from a target position. As a result, total (16+40×2)×1,920×68=12,533,760 pixels are transferred to the reference local memory 811 for motion estimation for one picture.

Furthermore, if it is assumed that a HD picture of H.264 is managed by the reference local memory 811, total (16+40×2+4)×1,920×68=13,056,000 pixels are received for motion estimation for one picture, in the same manner as described above.

As explained above, especially if a HD picture of H.264 is processed, a resulting transfer amount is extremely heavier as comparison to a SD picture of MPEG-2. Therefore, a technique for reducing the image transfer amount with sacrifice of an area cost. FIG. 5 is a schematic diagram showing how the external frame memory 820 is updated, in order to reduce a transfer amount of reference pixels.

If one picture Pic included in a to-be-coded stream has a frame structure, a SD picture has a width PW and a height PH which are 45 MB (=720 pixels) and 30 MB (=480 pixels), respectively, and a HD picture has a width PW and a height PH which are 120 MB (=1,920 pixels) and 68 MB (=1,088 pixels), respectively. Hereinafter, respective values of the width PW and the height PH are referred to as M (MB) and N (MB), respectively.

When the motion estimation unit 801 performs motion estimation for macroblocks in the n-th row of an original picture, the reference local memory 811 stores pixel data of (width PW of a reference picture)×(height PH of a motion estimation range for macroblocks in the n-th row of the original picture). More specifically, in the case of a SD picture, the reference local memory 811 stores reference pixel data of (i) macroblocks in a row corresponding the n-th row in the original picture (PW) and (ii) macroblocks in an immediately above row and a immediately below row of the row (PH). On the other hand, in the case of a HD picture, the reference local memory 811 stores reference pixel data of (i) macroblocks in a row corresponding the n-th row in the original picture (PW) and (ii) respective 40 pixels immediately above the macroblocks and respective 40 pixels immediately below the macroblocks (PH). Note that a center of motion estimation (motion estimation center) meCnt in a reference picture for each to-be-coded macroblock in the n-th row and the m-th column in the original picture may be at the same position of the to-be-coded macroblock, or may be a different position which is shifted from the to-be-coded macroblock position.

As described above, by adding a sub memory area to keep an area larger than the actual motion estimation range, it is possible to reduce the image transfer amount by about (1 MB unit height)/(vertical height of the motion estimation range).

Furthermore, FIG. 6 is a schematic diagram showing how stored pixels are managed, in order to reduce a capacity of the reference local memory 811. A reference area RefArea is an area which is used as reference for a current target macroblock in the motion estimation unit 801. A sub memory area SubArea is an area which is not used as reference for the target macroblock in the current motion estimation, but used in subsequent motion estimation. A next renewed area NxtArea is an area which is used as reference for a next target macroblock. A next released area RelArea is an area which becomes unnecessary in and after motion estimation for the next target macroblock, and to which a next renewed area NxtArea is overwritten as a physical memory area. The increase of the area cost can be restrained by deleting the sub memory area SubArea in the range stored in the reference local memory 811, as shown in FIG. 6.

However, as shown in FIG. 6, if memory addresses are processed by first in, first-out (FIFO) method in an area in which these rectangular areas are combined in the reference local memory 811, address management becomes quite difficult. FIG. 7 is a diagram showing a physical address layout around a logical boundary in the reference logical memory 811, when the FIFO management is used. For the sake of simplified explanation, in FIG. 7, it is assumed that the picture is a Quarter Video Graphics Array (QVGA) picture of horizontally 320×vertically 240 pixels, that a motion estimation range has ±16 pixels in horizontal and vertical directions, and the each word has 8 pixels. Under the assumption, FIG. 7 shows addresses around a boundary of address 0, when address mapping is performed as raster addresses from top left.

In FIG. 7 (a), an area HLA enclosed by a doted line is an area whose addresses are all able to be stored in the reference local memory 811, from address 0 to the last address. In this figure, the addresses are sequentially allocated from top left of the picture from the address 0. In this example, it is assumed that the area HLA has total 1408 words of (i) an area (a right-down shaded portion, a horizontally lined portion, and a lattice portion) in which horizontal 40 words (320 pixels)×vertical 32 words (240 pixels) are arranged, and (ii) an area (a doted portion) in which horizontal 6 words (48 pixels)×vertical 16 words (16 pixels) as a part of a motion estimation range, and horizontal 2 words (16 pixels)×vertical 16 words (16 pixels) as a part of an update area are arranged. FIG. 7 (b) shows physical address numbers included in the first macroblock. Since one macroblock horizontally has 2 words (16 pixels) and one picture horizontally has 40 words (320 pixels), as shown in FIG. 7 (b), the address numbers are horizontally allocated with respective 40 intervals in the first macroblock.

FIG. 7 (c) shows physical addresses in a pixel space around a part of boundary of the area HLA enclosed by the doted line. When all addresses in the area HLA are filled by pixel transfer for a macroblock, and after that, a next macroblock is to be transferred to be stored, the reference local memory 811 uses the FIFO method and the physical addresses of the next released area RelArea at top left are used for addresses of a next renewed area NxtArea. In more detail, a left-down shaded portion is shown beyond the area HLA, since this portion is not able to be stored at the same time in the reference local memory 811. After the physical addresses in the top-left macroblock shown in FIG. 7 (b) are used for motion estimation and become delete-able, the left-down shaded portion is overwritten with these addresses for the next macroblock.

Therefore, pixels positioned in and around a circle of FIG. 7 (c) are transferred, addresses around the boundary of the area HLA become inconsistent, which fails data access by general raster addresses. Moreover, positions in a horizontal direction of this address 0 are not allocated with respective unique addresses, because the horizontal positions are determined depending on vertical positions. As a result, the address calculation becomes more difficult.

As described above, if the FIFO method is used in the reference local memory 811 to manage physical addresses in the area in which rectangular areas are combined, the addresses are re-used at ill-defined pixel space positions, so that addresses management becomes significantly difficult, requiring various calculation such as division and modulo operations in addition to multiplication operation. Therefore, as a result of necessity of such complicated address calculation, various problems occur. For example, in the case of hardware implementation, a circuit area is increased, and operation timings for processing become difficult. In the case of software implementation, huge processing cycle numbers are required.

SUMMARY OF THE INVENTION

Thus, in a view of the above problems, an object of the present invention is to provide a motion estimation device, a motion estimation method, a motion estimation integrated circuit, and a picture coding device. By the present invention, a memory capacity, an embedded circuit size, and processing steps are all able to be reduced, in a motion estimation device in which the number of data transfers from an external frame memory to an internal reference local memory is reduced.

In order to achieve the above object, the motion estimation device according to the present invention estimates motion of each block in a picture. The motion estimation device includes: a storage unit operable to store a reference picture; a reference memory unit operable to store pixel data included in a transferred area of the reference picture, the pixel data being transferred from the storage unit; a motion estimation unit operable to estimate motion of a target block, for which motion estimation is performed, using pixel data in a motion estimation range included in the transferred area stored in the reference memory unit; and a memory control unit operable to update a part of the transferred area for use in a next target block, wherein the transferred area includes first to third rectangular areas, the first rectangular area includes the motion estimation range, the second rectangular area has a width that is from (i) a left-most pixel in the reference picture to (ii) a pixel on immediately left of a left-most pixel in the first rectangular area, a height that is L pixels lower than a height of the first rectangular area, and a bottom that is positioned at same horizontal level as a bottom of the first rectangular area, the third rectangular area has a width that is from (i) a right-most pixel in the reference picture to (ii) a pixel on immediately right of a right-most pixel in the first rectangular area, a height that is L pixels lower than the height of the first rectangular area, and an upper limit that is positioned at same horizontal level as an upper limit of the first rectangular area, L is expressed by power of 2, and the memory control unit is operable to transfer pixel data from an update area in the storage unit to a memory area in the reference memory unit, the update area being positioned on immediately right of the first rectangular area and immediately under the third rectangular area and having a height of L pixels and a width of K pixels, and the memory area being positioned in the first rectangular area at top left and having a height of L pixels and a width of K pixels.

Thereby, it is possible to: reduce an amount of data of reference pixels which is transferred from the storage unit (multi-frame memory) to the reference memory unit (internal reference memory); reduce a size of the embedded reference memory unit; simplify calculation performed by the memory control unit (reference memory control unit); and reduce a size of an embedded circuit.

Furthermore, the memory control unit may: divide the reference picture, by vertically dividing the reference picture into equal M columns, horizontally dividing the reference picture into rows each having a height of L pixels, and setting a height of the transferred area to N rows; and divide the reference memory unit into memory banks whose number is equal to or more than "M×(N−1)+1" and equal to or less than "M×N−1", and manage the divided memory banks in cycles by the FIFO method.

Thereby, in the address conversion in physical memory mapping performed by the memory control unit, it is possible to reduce complicated operations such as division, modulo, and multiplication. As a result, it is possible to further simplify the calculation performed by the memory control unit and further reduce a size of an embedded circuit.

Still further, the memory control unit may: divide a virtual space, which includes the reference picture and has power of 2 addresses in a horizontal direction, by vertically dividing the virtual space into equal M columns, where M is expressed by power of 2, horizontally dividing the virtual space into rows each having a height of L pixels, and setting a height of the transferred area to N rows; and divide the reference memory unit into memory banks whose number is equal to or more than "M×(N−1)+1" and equal to or less than "M×N−1", and manage the divided memory banks in cycles by the FIFO method.

Thereby, in the address conversion in physical memory mapping performed by the memory control unit, it is possible to implement the address conversion by bit shifting, bit masking, bit AND, and the like. As a result, it is possible to further simplify the calculation performed by the memory control unit and further reduce a size of an embedded circuit.

Still further, the first rectangular area may include a fourth rectangular area and a fifth rectangular area, the fourth rectangular area having a height of L pixels from a bottom of the first rectangular area, and the fifth rectangular area being an area other than the fourth rectangular area, the reference memory unit includes a first memory unit and an assistance memory unit, the first memory unit is operable to store the fifth rectangular area, the second rectangular area, and the third rectangular area by a FIFO method, the assistance memory unit is operable to store the fourth rectangular area by the FIFO method, and the memory control unit is operable, for the next target block, to: (i) transfer pixel data from the assistance memory unit to the first memory unit, the pixel data being included in an area having a height of L pixels and a width of K pixels positioned in the fourth rectangular area at left; and (ii) transfer pixel data in the update area from the storage unit to the assistance memory unit by the FIFO method.

Thereby, it is possible to manage the areas except the fourth rectangular area, with a memory capacity of (width of reference picture)×(height of motion estimation range−height of update area). As a result, it is possible to further simplify the calculation performed by the memory control unit and further reduce a size of an embedded circuit.

Still further, the assistance memory unit may store a sixth rectangular area immediately under the fourth rectangular area, a width of the sixth rectangular area being same as a width of the fourth rectangular area, the memory control unit may, for the next target block: transfer pixel data from the assistance memory unit to the first memory unit, the pixel data being included in an area having a height of L pixels and a width of K pixels positioned in the fourth rectangular area at left; and transfer both of the fourth rectangular area and the sixth rectangular area from the storage unit to the assistance memory unit by the FIFO method; and transfer pixel data in an extended update area from the storage unit to the assistance memory unit, the extended update area being obtained by extending the update area downwards, and the motion estimation unit may perform motion estimation using the fourth rectangular area, the fifth rectangular area, and the sixth rectangular area.

Thereby, although an amount transferred to the assistance memory unit (assistance memory) is increased, it is possible to extend a height of the motion estimation range by adding a minimum memory capacity.

Still further, the first rectangular area may include a seventh rectangular area and an eighth rectangular area, the seventh rectangular area having a height of L pixels from an upper limit of the first rectangular area, and the eighth rectangular area being an area other than the seventh rectangular area, the reference memory unit may include a first memory unit and an assistance memory unit, the first memory unit may store the eighth rectangular area, the second rectangular area, and the third rectangular area by a first in first out (FIFO) method, the assistance memory unit may store the seventh rectangular area by the FIFO method, and the memory control unit may, for a next target block: (i) transfer pixel data from the first memory unit to the assistance memory unit, the pixel data being included in an area having a height of L pixels and a width of K pixels positioned in the third rectangular area at left; and (ii) transfer pixel data in the update area from the storage unit to the first memory unit by the FIFO method.

Thereby, it is possible to manage the areas except the seventh rectangular area, with a memory capacity of (width of reference picture)×(height of motion estimation range−height of update area). As a result, it is possible to further simplify the calculation performed by the memory control unit and further reduce a size of an embedded circuit.

Still further, the assistance memory unit may store a ninth rectangular area on the seventh rectangular area, a width of the ninth rectangular area being same as a width of the seventh rectangular area, and the memory control unit may, for the next target block: transfer pixel data from the first memory unit to the assistance memory unit, the pixel data being included in an area having a height of L pixels and a width of K pixels positioned in the third rectangular area at left; manage both of the seventh rectangular area and the ninth rectangular area in the assistance memory unit by the FIFO method; and transfer pixel data the update area from the storage unit to the first memory unit.

Still further, the motion estimation unit may perform motion estimation using the seventh rectangular area, the eighth rectangular area, and the ninth rectangular area.

Thereby, although an amount transferred to the assistance memory unit is increased, it is possible to extend a height of the motion estimation range by adding a minimum memory capacity.

Note that the present invention is able to be realized not only as the motion estimation device, but also as: a motion estimation method having characteristic processing performed by the motion estimation device; a computer program product which, when loaded into a computer, allows the computer to execute the processing; and the like. It is obvious that such a program is able to be distributed via a recording medium such as a CD-ROM or a transmitting medium such as the Internet.

As is apparent from the above explanation, according to the motion estimation device of the present invention, it is possible to reduce the number of data transfers from the storage unit (external frame memory) to the reference memory unit (internal reference local memory), and also possible to reduce a memory capacity, an embedded circuit size, and processing steps.

FURTHER INFORMATION ABOUT TECHNICAL BACKGROUND TO THIS APPLICATION

The disclosure of Japanese Patent Application No. 2006-102563 filed on Apr. 3, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the present invention. In the Drawings:

FIGS. 14A and 14B are flowcharts of the address conversion performed by the motion estimation device according to the first embodiment of the present invention;

FIGS. 21A and 21B are schematic diagrams showing a structure of rectangular areas when a motion estimation range is positioned at edges of a reference picture;

FIGS. 23A and 23B are schematic diagrams showing managed areas for storing pixels of a reference picture used in a motion estimation device according to the fifth embodiment of the present invention;

DESCRIPTION OF THE PREFERRED EMBODIMENT(S)

The following describes embodiments according to the present invention with reference to FIGS. 8 to 27.

First Embodiment

Figure 8:
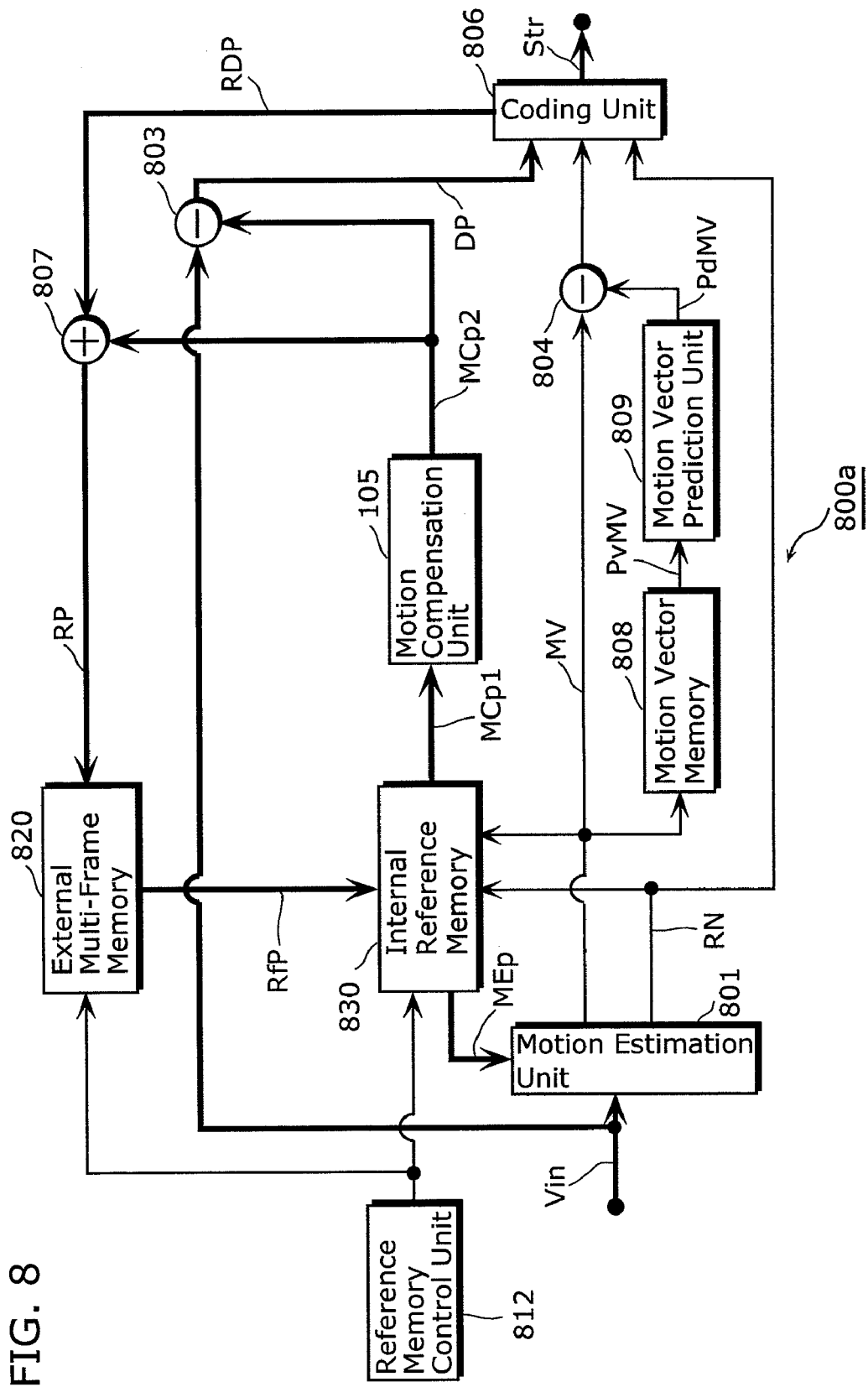
FIG. 8 is a block diagram showing a structure of an inter-picture prediction coding device using a motion estimation device according to the first embodiment.

FIG. 8 is a block diagram showing a structure of an inter-picture prediction coding device using a motion estimation device according to the first embodiment. Note that the reference characters of the conventional inter-picture prediction coding device of FIG. 1 are assigned to identical constituent elements in FIG. 8, so that the details of those elements are same as described above.

Figure 1:
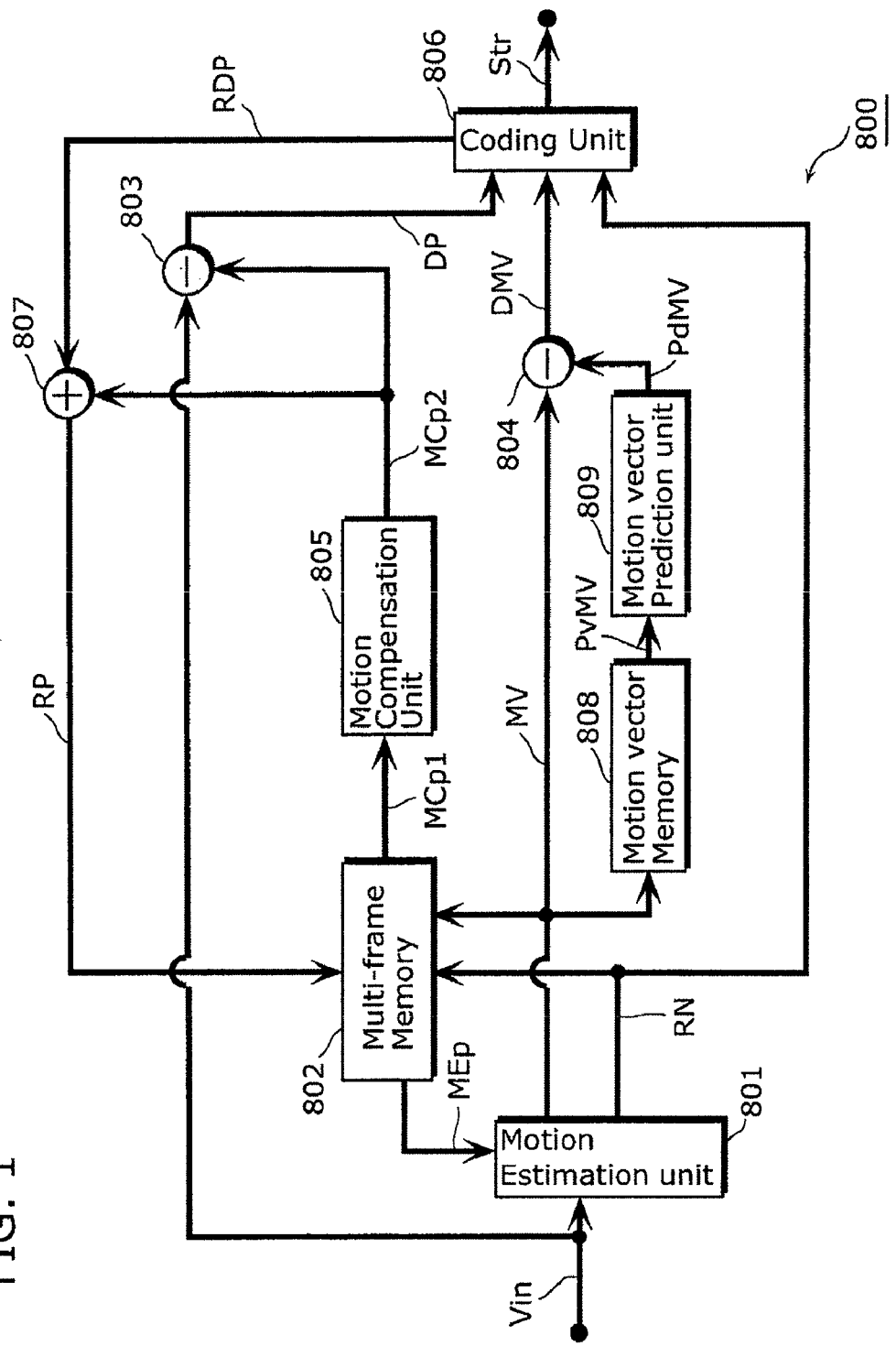
FIG. 1 is a block diagram showing the conventional inter-picture prediction coding device.
Figure 2:
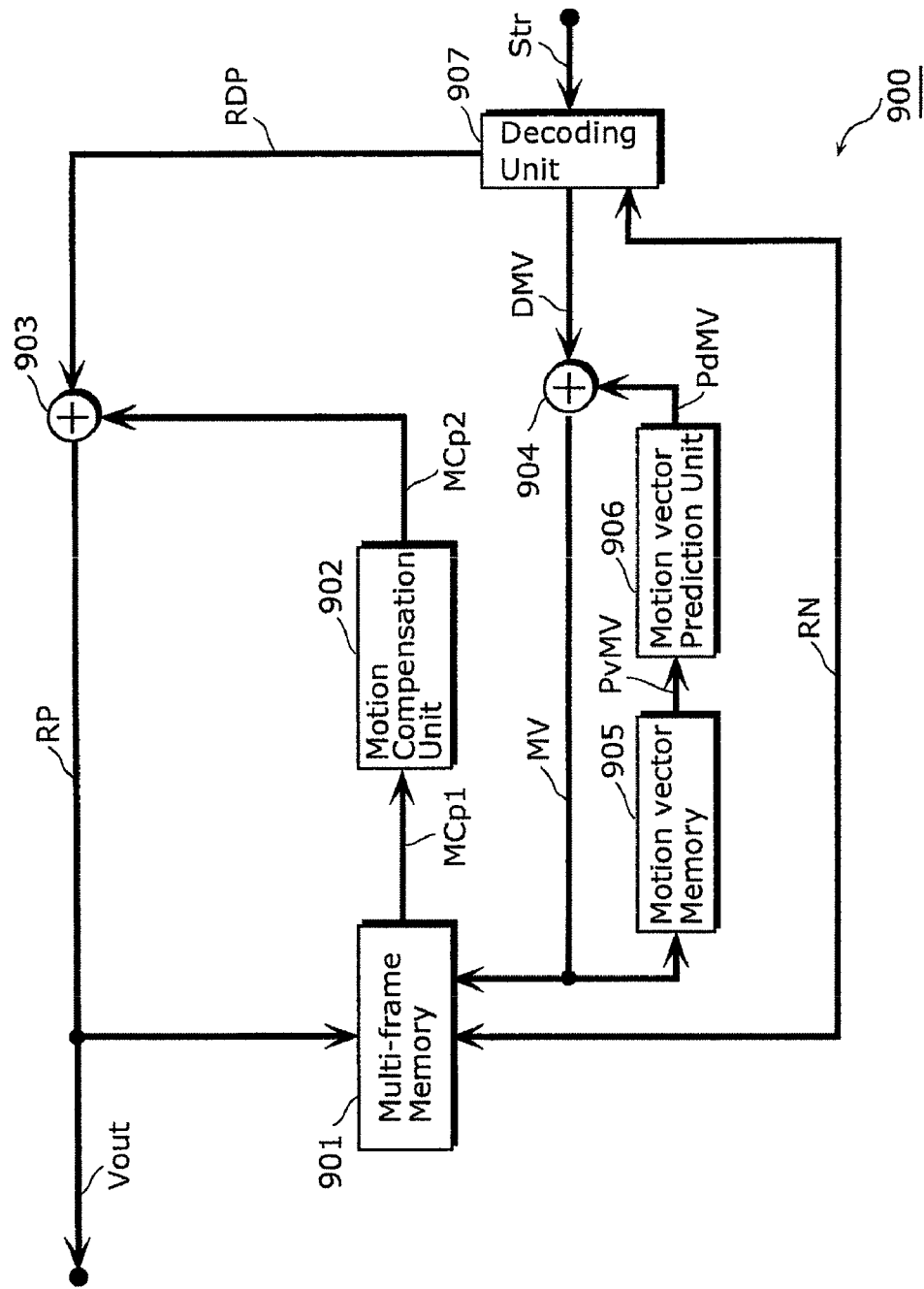
FIG. 2 is a block diagram showing the conventional inter-picture prediction decoding device.

The inter-picture prediction coding device according to the first embodiment differs from the conventional inter-picture prediction coding device of FIG. 1 in that the reference local memory 107 is replaced by an external multi-frame memory 820 and an internal reference memory 830, and that a reference memory control unit 812 is newly added. The internal reference memory 830 is embedded in a LSI which has constituent elements of the inter-picture prediction coding device other than the external multi-frame memory 820. The external multi-frame memory 820 is a large-capacity memory, such as a SDRAM, and arranged outside the LSI. The reference memory control unit 812 controls data transfer from the external multi-frame memory 820 to the internal reference memory 830.

The processing performed by the inter-picture prediction coding device is the almost same as the processing performed by the conventional inter-picture prediction coding device of FIG. 1. A decoded picture RP, as an adding result of the adder 807, is stored into the external multi-frame memory 820. Next, a range used in motion estimation is outputted from the external multi-frame memory 820 to the internal reference memory 830. Here, the reference memory control unit 812 controls the data transfer from the external multi-frame memory 820 to the internal reference memory 830.

Figure 3:
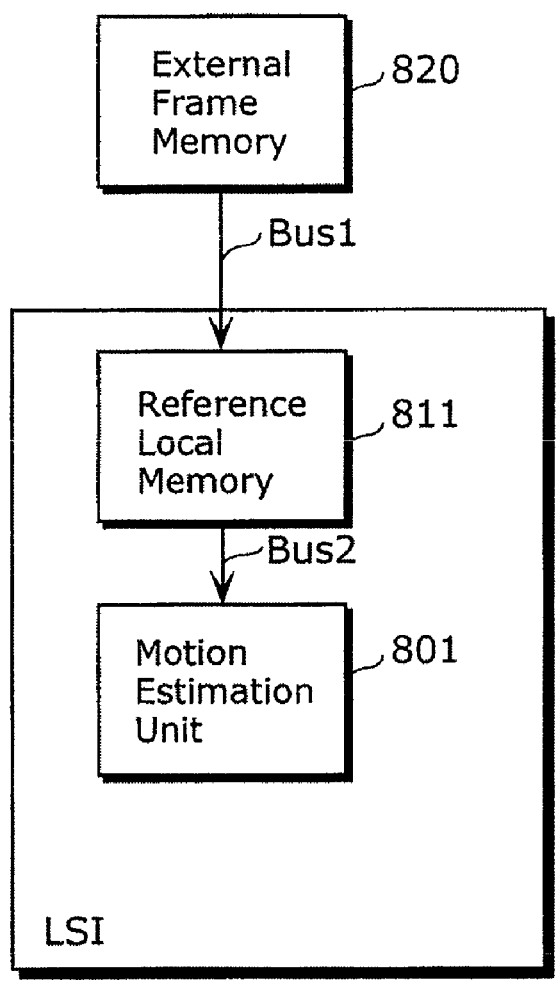
FIG. 3 is a block diagram showing a structure in which the inter-picture prediction coding device is connected with a frame memory.
Figure 4:
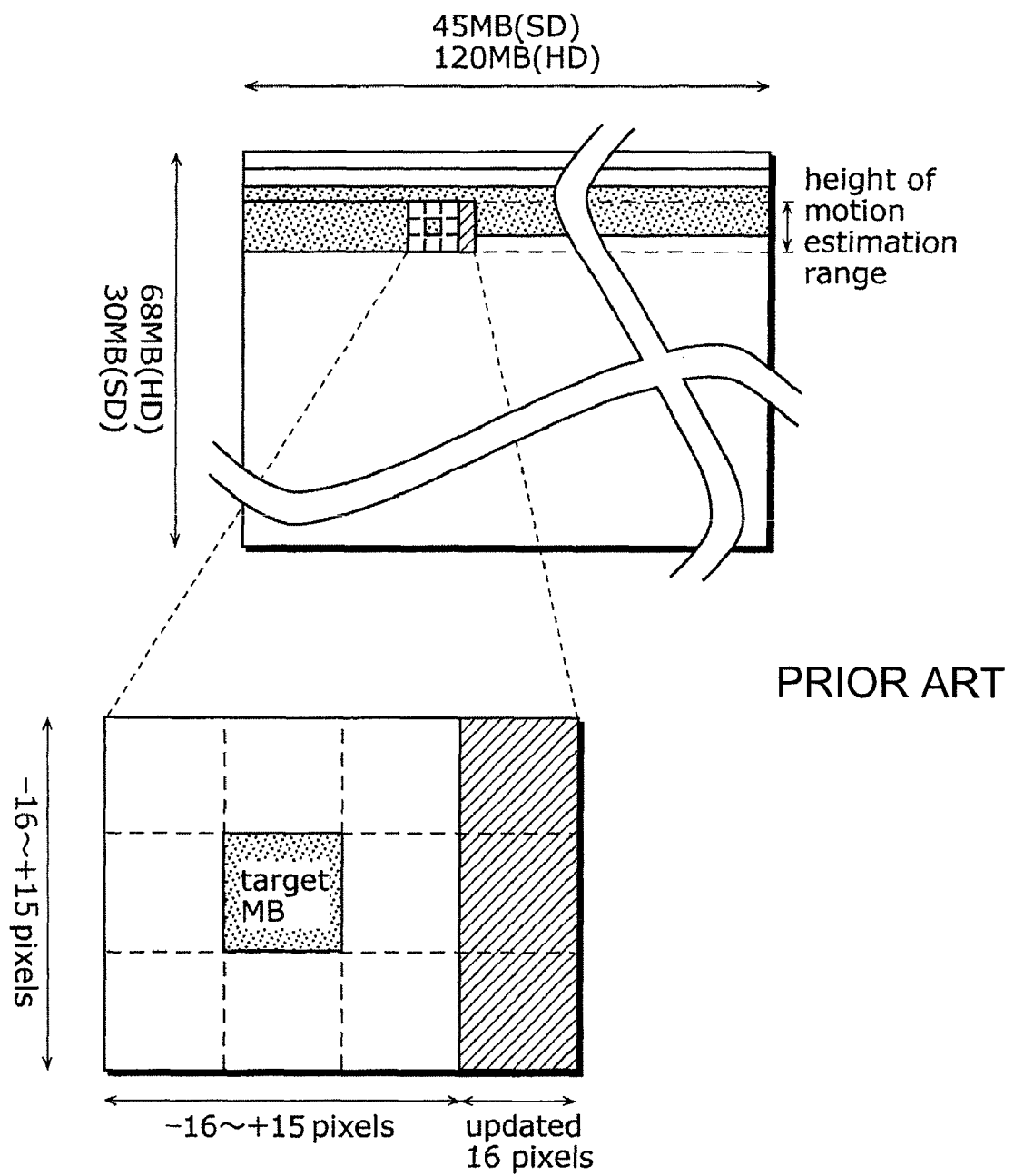
FIG. 4 is a schematic diagram showing how pixels in one reference picture are to be transferred.
Figure 5:
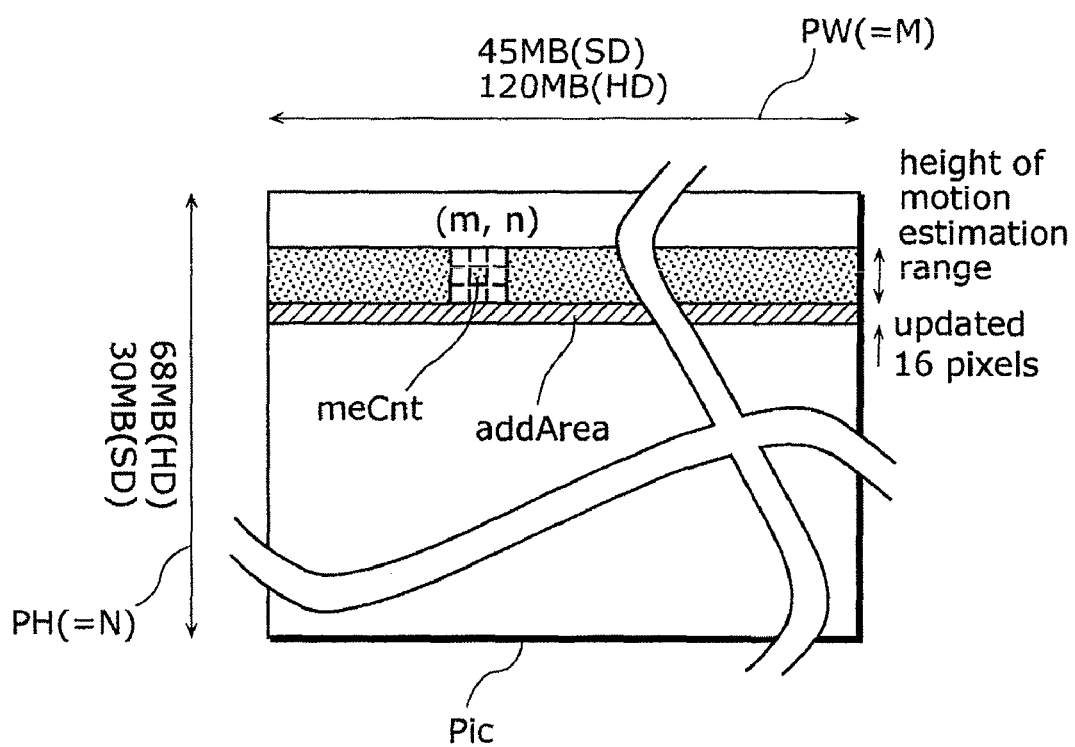
FIG. 5 is a schematic diagram showing how a memory is updated, in order to reduce a transfer amount of reference pixels.
Figure 6:
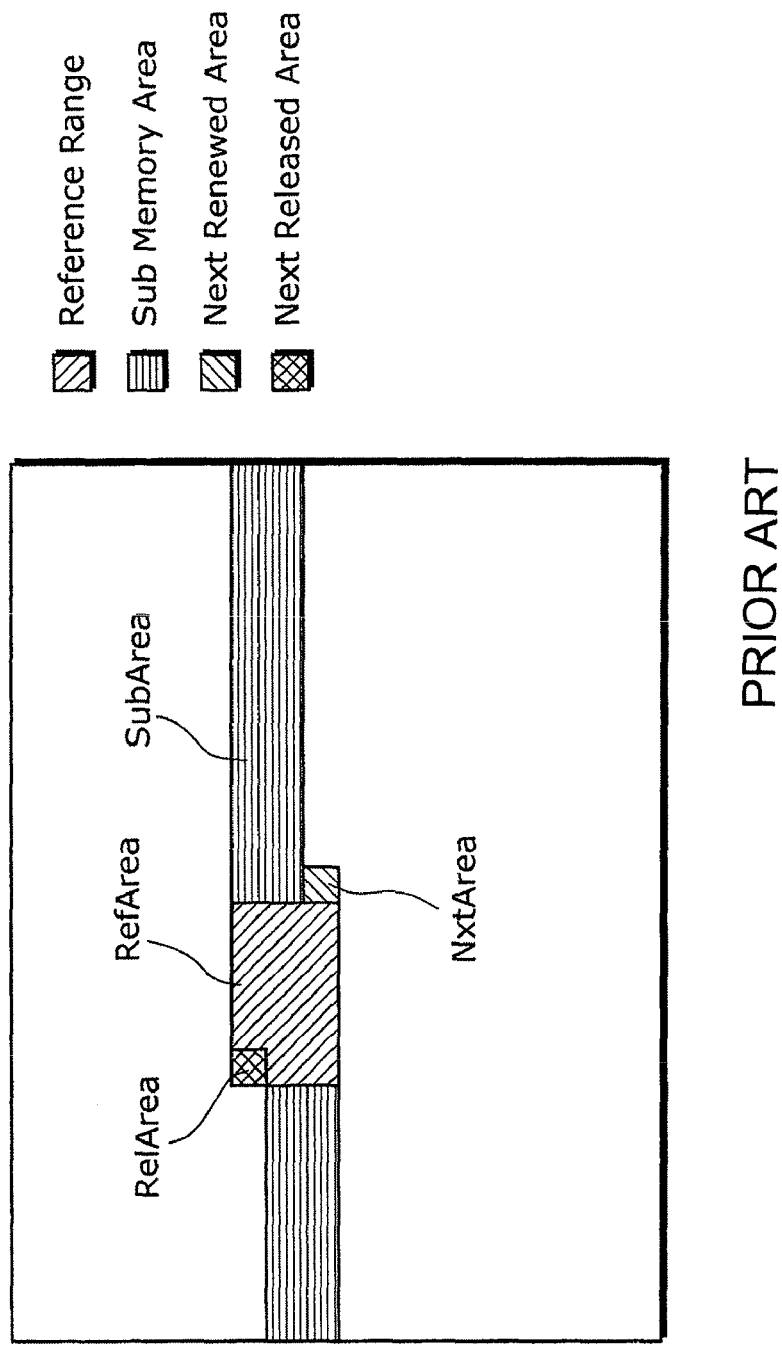
FIG. 6 is a schematic diagram showing how stored pixels are managed, in order to reduce a capacity of the reference local memory.
Figure 9:
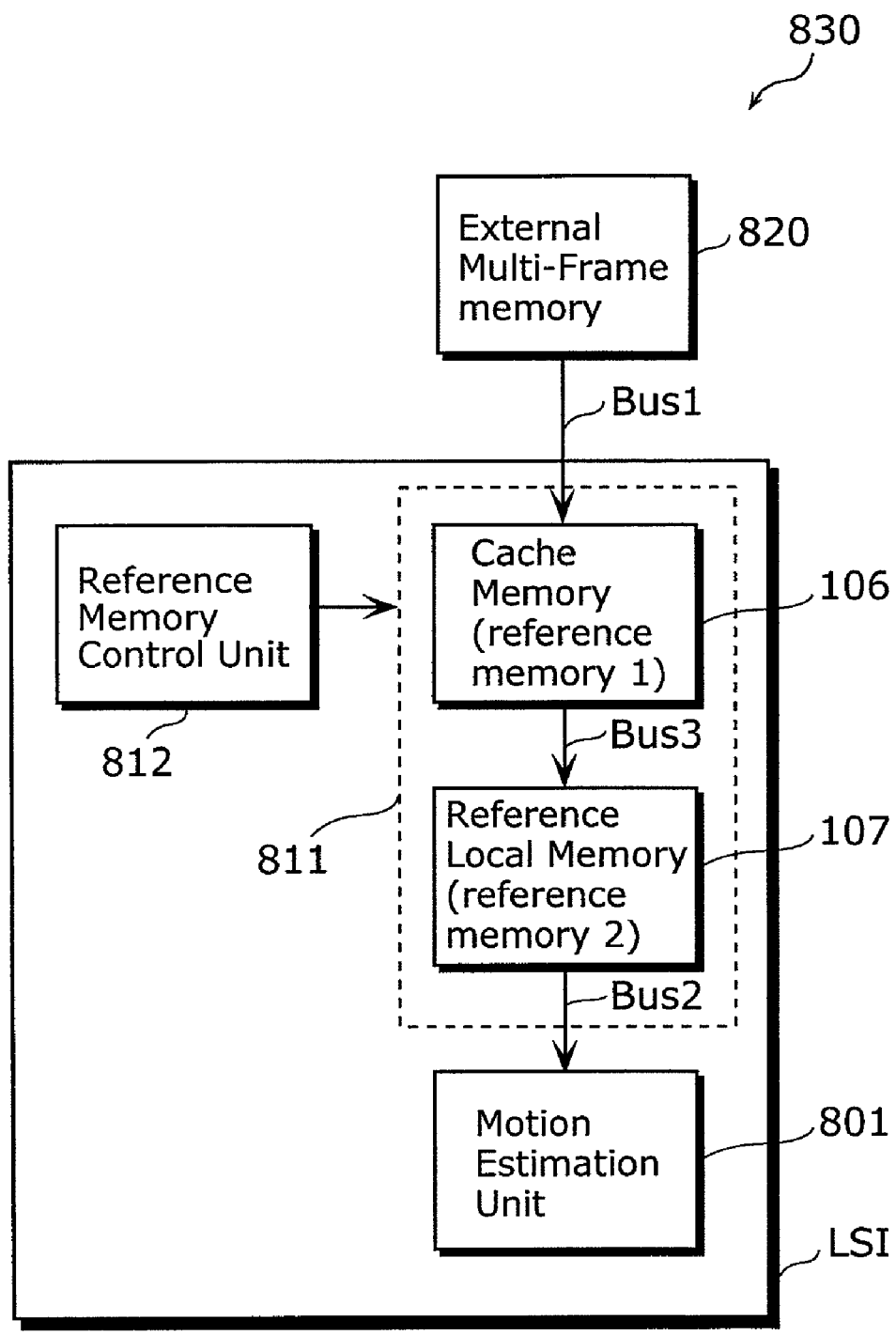
FIG. 9 is a block diagram showing a structure in which the inter-picture prediction coding device is connected with a frame memory.

FIG. 9 is a block diagram showing a structure in which the inter-picture prediction coding device is connected with the external multi-frame memory 820. Note that the reference characters in FIGS. 3 and 8 are assigned to identical constituent elements in FIG. 9 so that the details of those elements are same as described above. The internal reference memory 830 hierarchically includes: a cache memory 106 which temporarily stores pixels transferred from the external multi-frame memory 820; and a reference local memory 107 which stores pixel data actually used in motion estimation by the motion estimation unit 801. In such a hierarchical structure, the cache memory 106 is used as a temporal buffer for storing a limited amount of pixels transferred from outside of the LSI in order to reduce the transferred amount, and the reference local memory 107 is used as a memory for actual motion estimation with more frequent accesses.

The following describes processing of the internal reference memory 830 under the control of the reference memory control unit 812.

Figure 10:
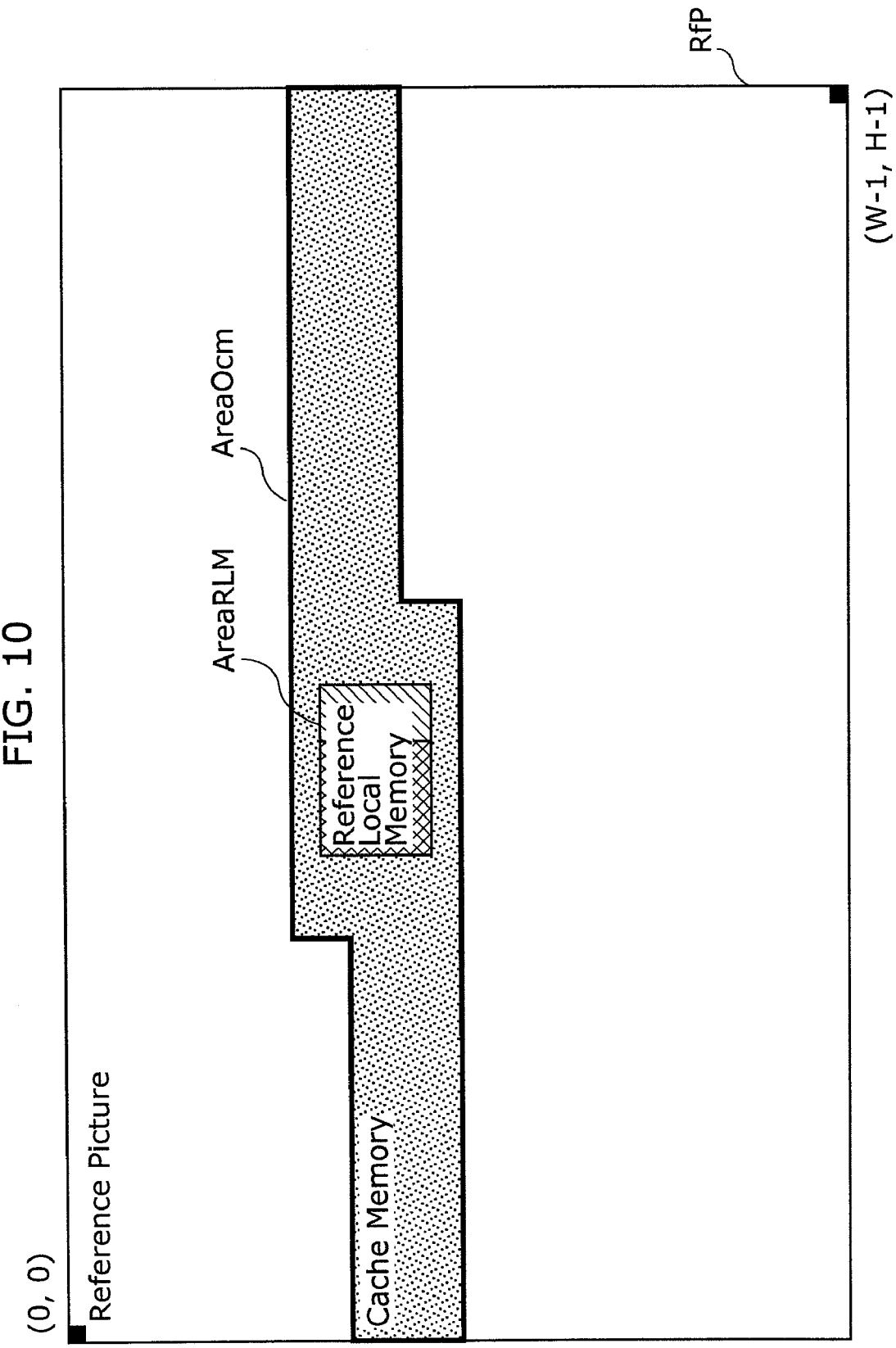
FIG. 10 is a schematic diagram showing memory areas in a cache memory and the reference local memory.

FIG. 10 is a schematic diagram showing memory areas in the cache memory 106 and the reference local memory 107. In FIG. 10, a reference area AreaRLM is shown as an area stored in the reference local memory 107. This reference area AreaRLM is made up of: a motion estimation range; and an update range located to the immediately right of the motion estimation range. A cache area AreaOCM is shown as an area stored in the cache memory 106. This cache area AreaOcm includes the above reference area AreaRLM.

Figure 11:
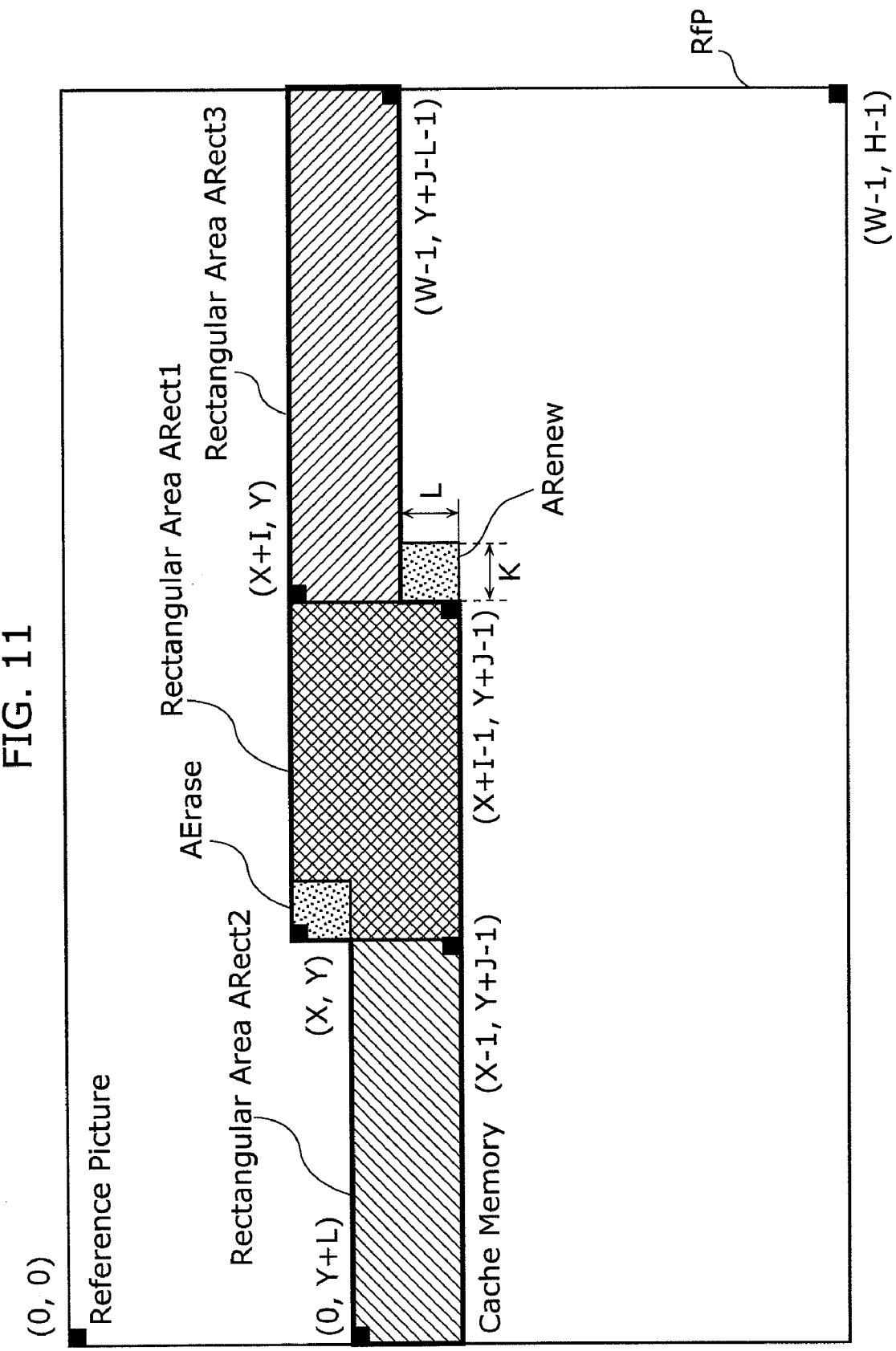
FIG. 11 is a schematic diagram showing a structure of rectangular areas stored in the cache memory.

FIG. 11 is a schematic diagram showing a structure of rectangular areas stored in the cache memory 106. In FIG. 11, the cache area AreaOcm is segmented into further rectangular areas of a rectangular area ARect1, a rectangular area ARect2, and a rectangular area ARect3. The rectangular area ARect1 includes the reference area AreaRLM. The rectangular area ARect2 is located on the left of the rectangular area ARect1. A width of the rectangular area ARect2 is from (i) a left-most pixel in the reference picture to (ii) a pixel on the immediately left of a left-most pixel in the rectangular area ARect1. A height of the rectangular area ARect2 is L pixels lower than a height of the rectangular area ARect1. A bottom of the rectangular area ARect2 is positioned at the same horizontal level as a bottom of the rectangular area ARect1. The rectangular area ARect3 is located on the right of the rectangular area ARect1. A width of the rectangular area ARect3 is from (i) a right-most pixel in the reference picture to (ii) a pixel on the immediately right of a right-most pixel in the rectangular area ARect1. A height of the rectangular area ARect3 is L pixels lower than a height of the rectangular area ARect1. An upper limit of the rectangular area ARect3 is positioned at the same horizontal level as an upper limit of the rectangular area ARect1. In addition, a next renewed area ARenew is a memory area to be added for motion estimation for a next macroblock, and a next released area AErase is an area positioned on the upper left in the rectangular area ARect1. In the cache memory 106, the next renewed area ARenew and the next released area AErase share the physically same memory area. The physical memory area is overwritten by the FIFO method, where the next renewed area ARenew is the beginning of the FIFO and the next released area AErase is the end of the FIFO. Here, it is assumed that a width and a height of the reference picture RfP are W pixels and H pixels, respectively, that a width and a height of the motion estimation range are equal to or less than I pixels and equal to or less than J pixels, respectively, and that a width and a height of the next renewed area ARenew and the next released area AErase are K pixels and L pixels, respectively. Under the assumption, if a width and a height of the rectangular area ARect1 are I pixels and J pixels, respectively, coordinates of diagonally-positioned vertexes of the rectangular area ARect1 are (X, Y) and (X+I−1, Y+J−1), coordinates of diagonally-positioned vertexes of the rectangular area ARect2 are (0, Y+L) and (X−1, Y+J−1), and coordinates of diagonally-positioned vertexes of the rectangular area ARect3 are (X+I, Y) and (W−1, Y+J−L−1).

Figure 12:
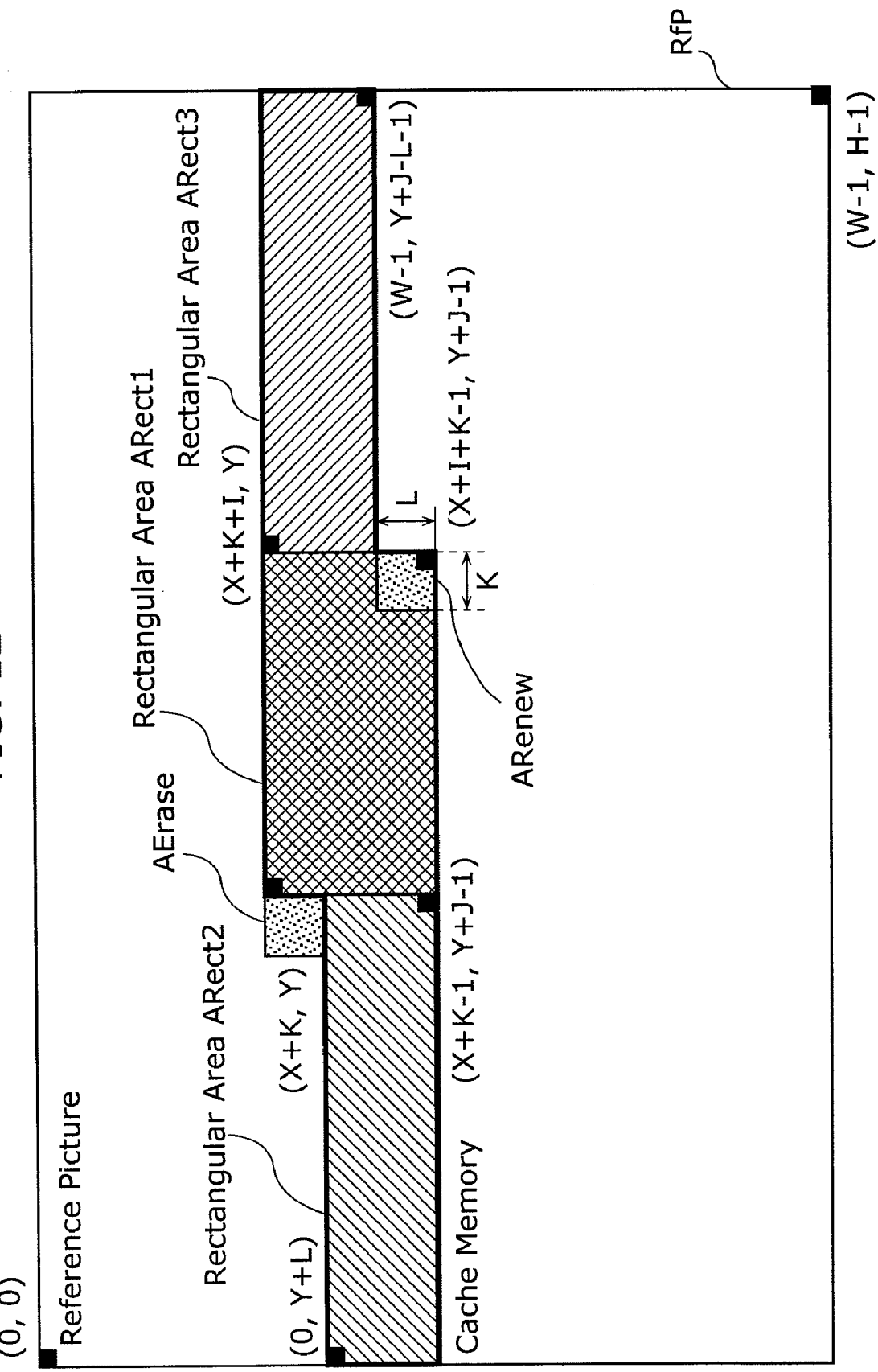
FIG. 12 is a schematic diagram showing a structure of rectangular areas when next motion estimation is performed.

FIG. 12 is a schematic diagram showing a structure of rectangular areas when subsequent motion estimation is performed. In FIG. 12, the reference characters in FIG. 11 are assigned to identical areas in FIG. 12 so that the details of those areas are same as described above. However, the structure of FIG. 12 differs from the structure of FIG. 11 in that the next renewed area ARenew and the next released area AErase are positioned for the previous motion estimation applied to a prior macroblock. When motion estimation proceeds to a next macroblock and the situation of FIG. 11 is changed to the situation of FIG. 12, coordinates of diagonally-positioned vertexes of the rectangular area ARect1 are (X+K, Y) and (X+I+K−1, Y+J−1), coordinates of diagonally-positioned vertexes of the rectangular area ARect2 are (0, Y+L) and (X+K−1, Y+J−1), and coordinates of diagonally-positioned vertexes of the rectangular area ARect3 are (X+K+I, Y) and (W−1, Y+J−L−1).

The basic processing for the areas are performed as shown in FIGS. 11 and 12. The following describes a method of calculating physical addresses. According to the first embodiment of the present invention, a vertical length of the next renewed area ARenew and the next released area AErase is limited to be power of 2, so that conversion from a virtual logical space address to a physical address is able to be easily realized. For example, even if a vertical length (L) of a to-be-coded macroblock is 12 pixels, L is updated as 16 (=2^4, where ^ represents exponentiation) pixels. Here, the number of pixels in one word is also desirably power of 2.

Figure 7:
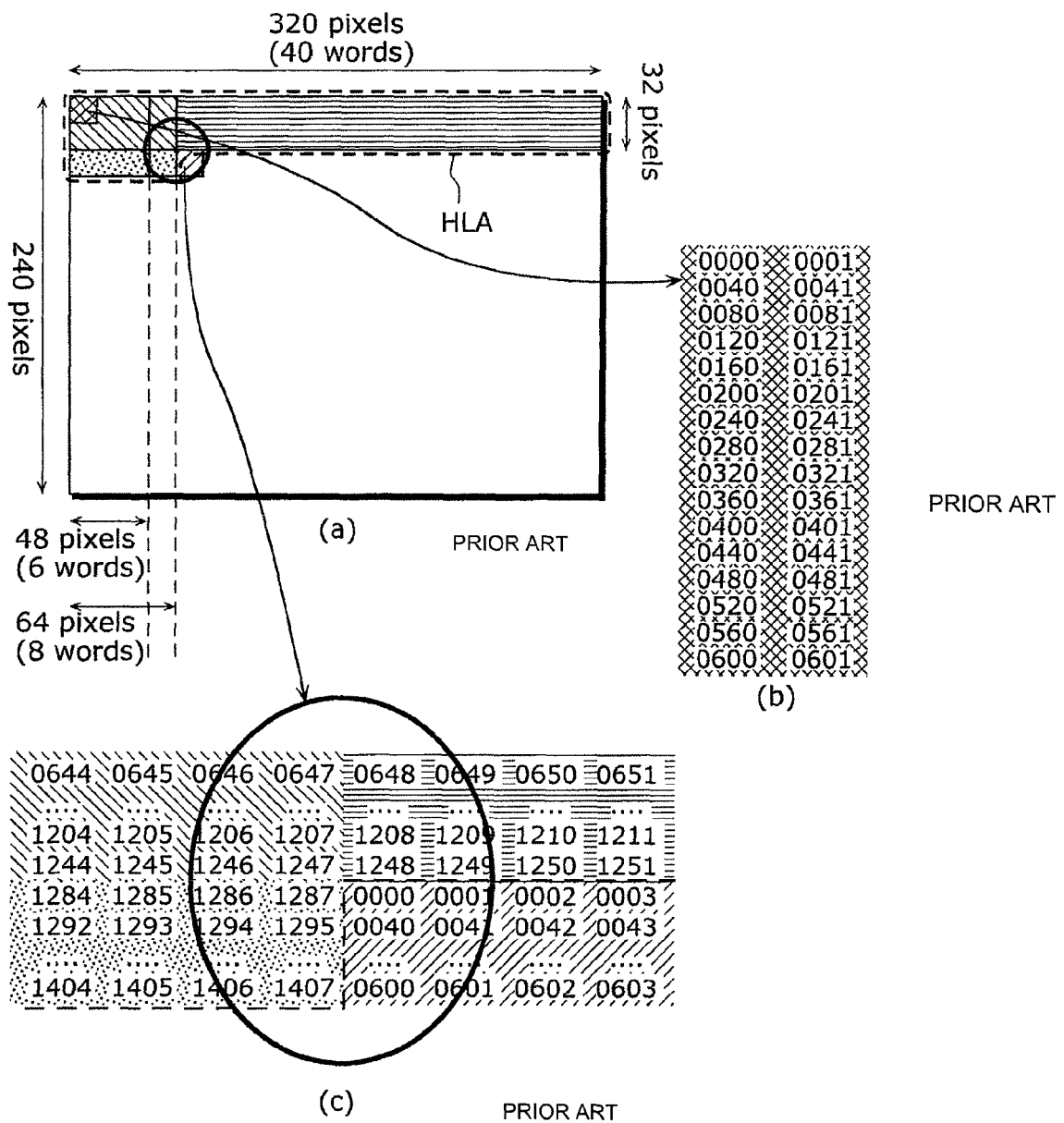
FIG. 7 is a diagram showing a physical address layout around a logical boundary in the reference logical memory, when the FIFO management is used.
Figure 13:
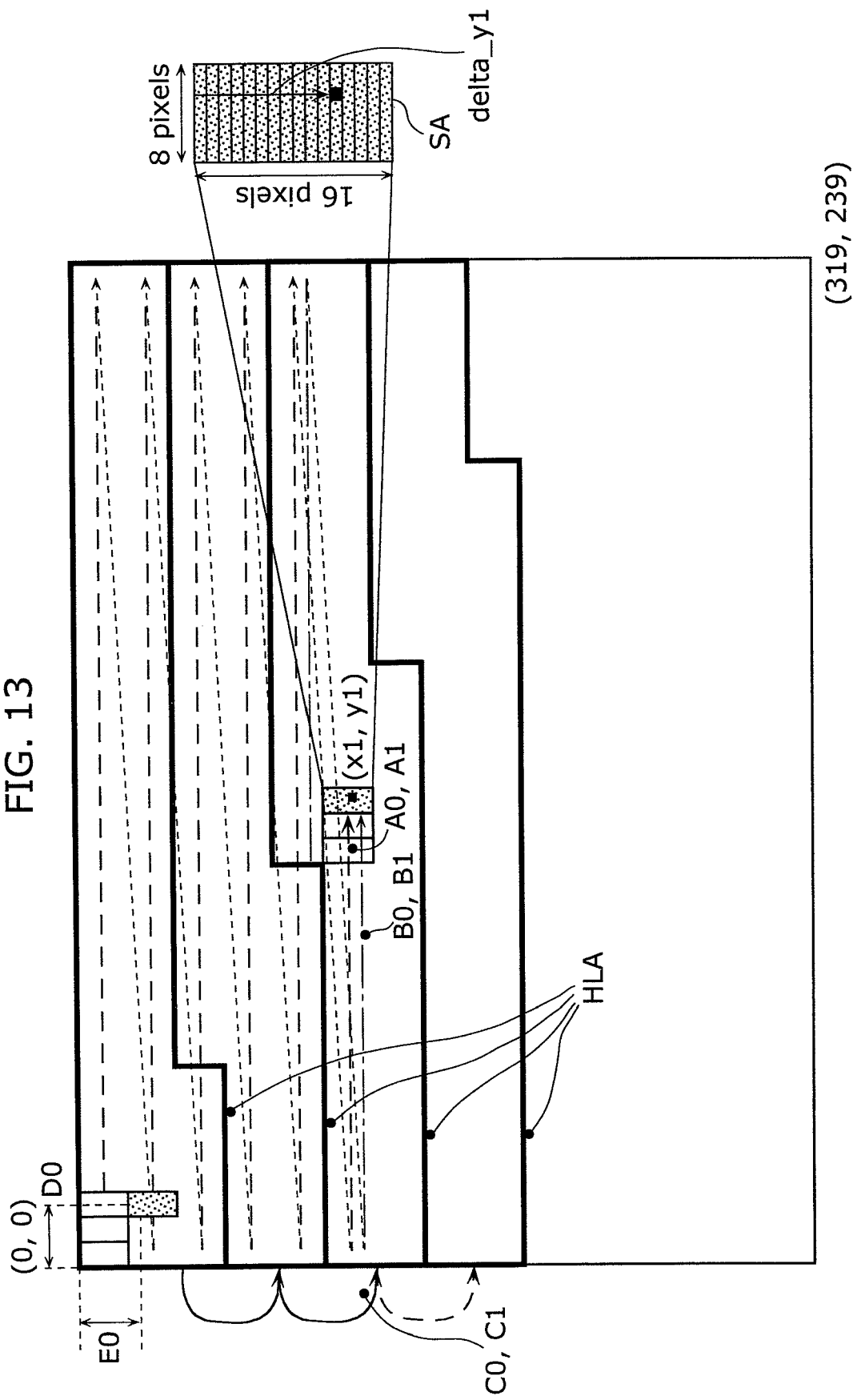
FIG. 13 is a schematic diagram showing positions of intermediate information of address conversion performed by the motion estimation device according to the first embodiment of the present invention.

FIG. 13 is a schematic diagram showing positions of intermediate information of the address conversion performed by the motion estimation device according to the first embodiment of the present invention. For the sake of the simplified explanation, FIG. 13 shows, like FIG. 7, the reference picture RfP as a QVGA picture of horizontal 320×vertical 240 pixels, where one word has 8 pixels. Furthermore, each of areas HLA shown by thick lines is an area on which physical addresses from 0 to 1407 are mapped, assuming that a motion estimation range is vertical±16 pixels (±2 words)×horizontal±16 pixels (±2 words) and a update range added to the motion estimation range is horizontal 16 pixels (2 words)×vertical 48 pixels. When data is written at a virtual logical space position outside the thick line, previous data at the position is physically overwritten by the data in order to use the cache memory 106 by the FIFO method. In other words, respective first pixels in these areas HLA are stored in cycles in a specific address number (a physical address 0, for example) fixed in the cache memory in which addresses are managed by the FIFO method.

In FIG. 13, a small area SA represents a small area of (1 word)×(L pixels). In the first embodiment, the address conversion calculation becomes easy by changing L to power of 2. A0 and A1 represent a position of the small area SA in a raster order of arranging small areas SA in the reference picture RfP from an original point (0, 0). B0 and B1 represent a position of the small area SA in a raster order of arranging small areas SA in an area HLA (shown by a thick line) from the top left of the area HLA. C0 and C1 represent a position of the area HLA including the small area SA, among the areas HLA in the reference picture RfP. D0 and E0 represent a horizontal position and a vertical position, respectively, of each small area SA which shares the same physical address numbers of a top-left small area SA.

FIGS. 14A and 14B are flowcharts of two different address conversion performed by the motion estimation device according to the first embodiment. FIG. 14A shows address conversion from virtual logical space positions, which are raster addresses as disclosed in the conventional technologies, into physical addresses. FIG. 14B shows another address conversion from virtual logical space positions, which are serial addresses allocated in each small SA, into physical addresses. The following describes both of the address conversion.

In FIG. 14A, the address conversion starts at Step S1400. Assuming that coordinates of a target virtual logical space position is (x0, y0), firstly A0 and relative coordinates (delta_x0, delta_y0) of the position in the small area SA are calculated according to the following equations 1 to 3 (Step S1401). Here, L represents 16 pixels and one word has 8 pixels in FIG. 13, so that bit shifting and bit masking are able to be used in division and modulo operations for calculating the A0 and the relative coordinates (delta_x0, delta_y0). Hereinafter, ">>" represents bit shifting, "&" represents bit AND, "%" represents a modulo operation, and "/" represents an integer division operation.

$$A0=(y0>>4)*40+(x0>>3) \quad \text{(equation 1)}$$

$$delta\_x0=x0\&0x7 \quad \text{(equation 2)}$$

$$delta\_y0=y0\&0xF \quad \text{(equation 3)}$$

Next, with a value of 88 which is the number of words included in the area HLA shown by a thick line, B0 and C0 are calculated using division and modulo operations according to the following equations 4 and 5 (Step S1402).

$$B0=A0\%88 \quad \text{(equation 4)}$$

$$C0=A0/88 \quad \text{(equation 5)}$$

Then, with a value of 40 which is the number of words in a width of the reference picture RfP, D0 and E0 are calculated using division and modulo operations according to the following equations 6 and 7 (Step S1403).

$$D0=B0\%40 \quad \text{(equation 6)}$$

$$E1=B0/40 \quad \text{(equation 7)}$$

Then, it is determined whether B0 is less than 80 (Step S1404). If B0 is less than 80 (Yes at Step S1404), then the following equation 8 is performed thereby converting the target virtual logical space address to a physical address adr0 (Step S1405). If B0 is equal to or more than 80 (No at Step S1404), then the following equation 9 is performed thereby converting the target virtual logical space address to a physical address adr0 (Step S1406).

$$adr0=D0+(E0*40)<<4+delta\_y0*40 \quad \text{(equation 8)}$$

$$adr0=D0+(E0*40)<<4+delta\_y0*8 \quad \text{(equation 9)}$$

Here, since the height L of the small area SA is power of 2, the equations 8 and 9 can use not multiplication but bit shifting (shifting 4 bits to the left).

Moreover, as another address conversion, by allocating serial addresses in the small SA as shown in FIG. 14B, calculation can be simplified. This address conversion starts at Step S1410. Assuming that coordinates of a target virtual logical space position, which is a serial address sequentially allocated in a small area SA, are (x1, y1), firstly A1 and relative coordinates (delta_x1, delta_y1) of the position in the small area SA are calculated according to the following equations 10 to 12 (Step S1411). Here, like FIG. 14A, since one word has 8 pixels, bit shifting and bit masking are able to be used in division and modulo operations for calculating the A1 and the relative coordinates (delta_x1, delta_y1).

$$A1=(y1>>4)*40+(x1>>3) \quad \text{(equation 10)}$$

$$delta\_x1=x1\&0x7 \quad \text{(equation 11)}$$

$$delta\_y1=y1\&0xF \quad \text{(equation 12)}$$

Next, with a value of 88 which is the number of words included in the area HLA shown by a thick line, B1 and C1 are calculated using division and modulo operations according to the following equations 13 and 14 (Step S1412).

$$B1=A1\%88 \quad \text{(equation 13)}$$

$$C1=A1/88 \quad \text{(equation 14)}$$

Then, the following equation 15 is performed thereby converting the target virtual logical space address to a physical address adr1 (Step S1413).

$$adr1=B1<<4+delta\_y1 \quad \text{(equation 15)}$$

In this address conversion, since a height L of the small area SA is power of 2, the equation 15 can use not multiplication but bit shifting (shifting 4 bits to the left).

Second Embodiment

The following describes processing of the internal reference memory 830 under the control of the reference memory control unit 812 according to the second embodiment.

Figure 15:
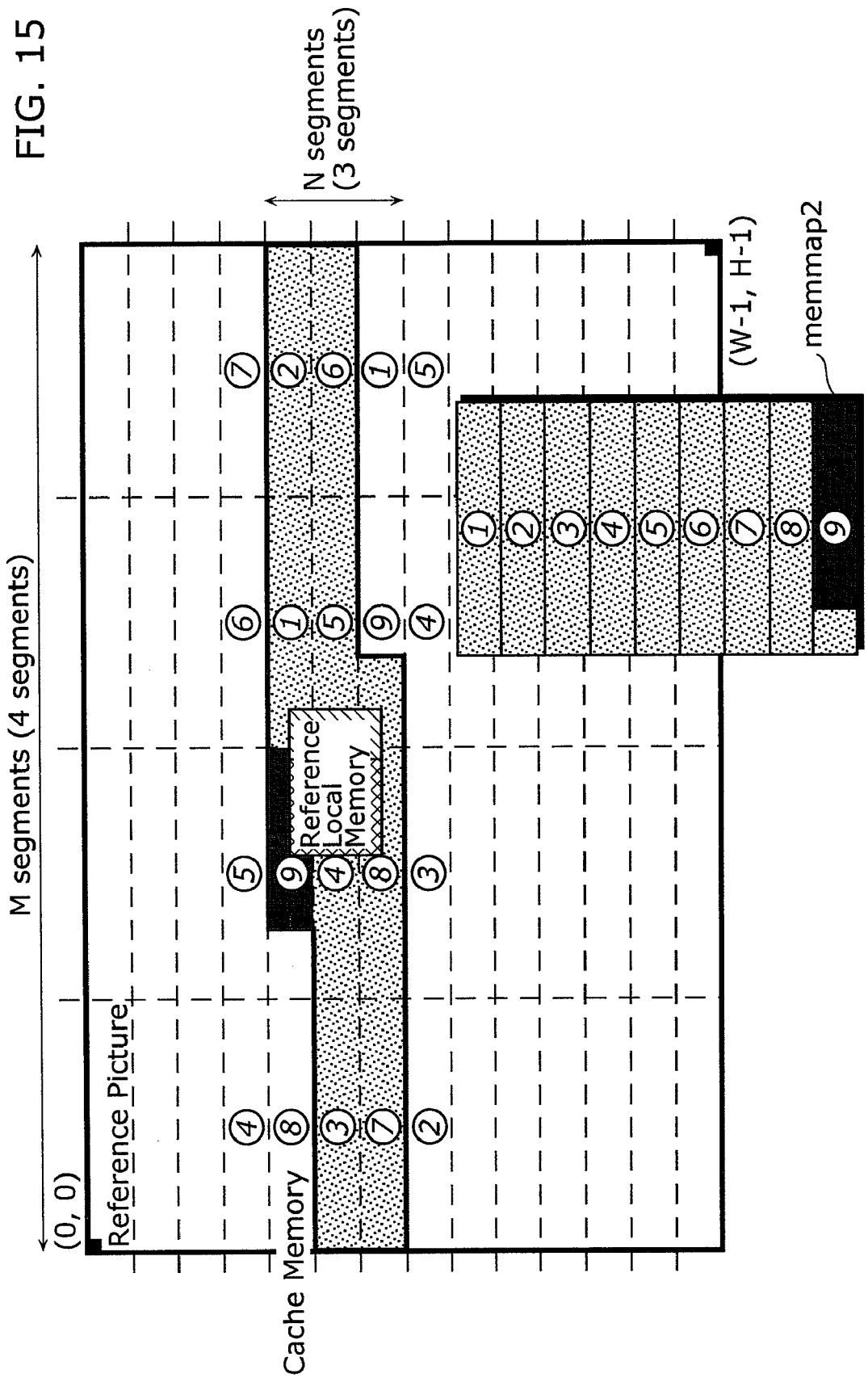
FIG. 15 is a schematic diagram showing a management area storing pixels of a reference picture used in a motion estimation device according to the second embodiment of the present invention.

FIG. 15 is a schematic diagram showing segments managed by the reference memory control unit 812, according to the second embodiment of the present invention. Pixels of a reference picture RfP, which are used in the motion estimation device, are stored in the managed segments. According to the second embodiment of the present invention, a virtual logical space of the cache memory 106 is divided into segments. In more detail, a width of the reference picture RfP is divided into M segments, where M is power of 2. A height of the reference picture RfP is divided into segments each of which has the height L of the next renewed area Arenew. A height of the motion estimation range is set to N segments. These segments are managed in cycles by the FIFO method. FIG. 15 shows a situation where segments 1 to 9 appear in the virtual logical space in cycles. A physical map memmap2 is a map on which the segments 1 to 9 are arranged. A thick hatched portion in the segment 9 is overwritten by a thin hatched portion.

Figure 16:
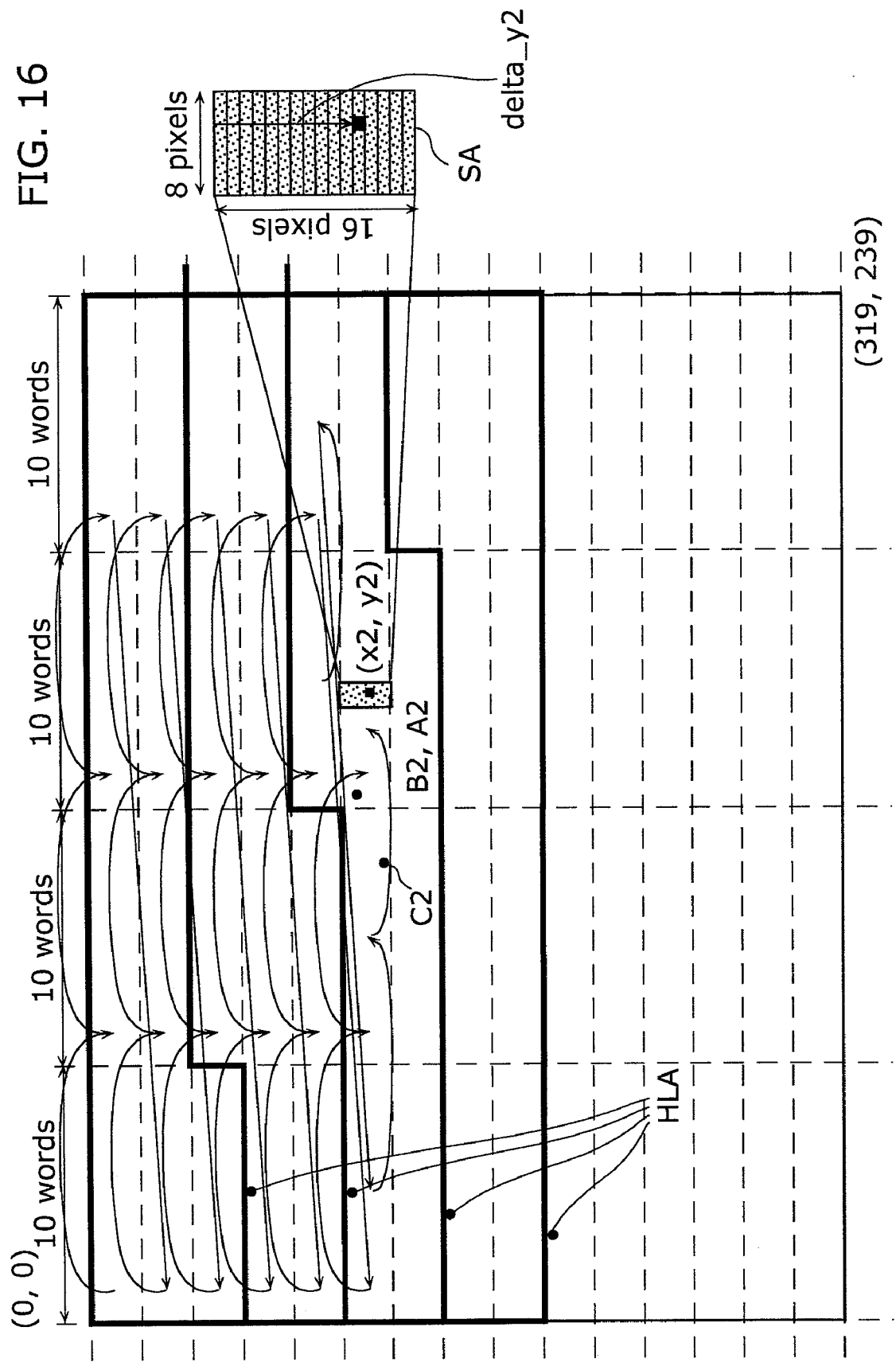
FIG. 16 is a schematic diagram showing positions of intermediate information of address conversion performed by the motion estimation device according to the second embodiment of the present invention.

A method of address conversion for the above virtual logical space is described in detail with reference to FIGS. 16 and 17. FIG. 16 is a schematic diagram showing positions of intermediate information of the address conversion performed by the motion estimation device according to the second embodiment of the present invention. For the sake of simplified explanation, FIG. 16 shows, like FIG. 7, the reference picture RfP as a QVGA picture of horizontal 320× vertical 240 pixels, where one word has 8 pixels. It is assumed that, in the management, a width of each managed segment is 10 words. The value of 10 words is obtained by dividing a width of the reference picture RfP (40 words) by 4 that is power of 2. Here, if the width of the picture is not able to be divided by power of 2, it is considered that right-most segments include invalid pixels. For example, even if the width of the reference picture RfP is 38 words, in the management the width is considered as 40 words.

Note that the same reference characters in FIG. 13 are assigned to the identical elements in FIG. 16, so that the details of those elements are the same as described above.

Here, A2 represents a position of a small area SA in a raster order of arranging small areas SA in the reference picture RfP from an original point (0, 0), assuming that each small area SA is (1 word)×(L pixels)=(8 pixels)×(16 pixels). B2 represents a position of the small area SA in a raster order of arranging small areas SA in an area HLA from the top left of the area HLA. C0 represents a position of the area HLA including the small area SA, among the areas HLA in the reference picture RfP.

Figure 17:
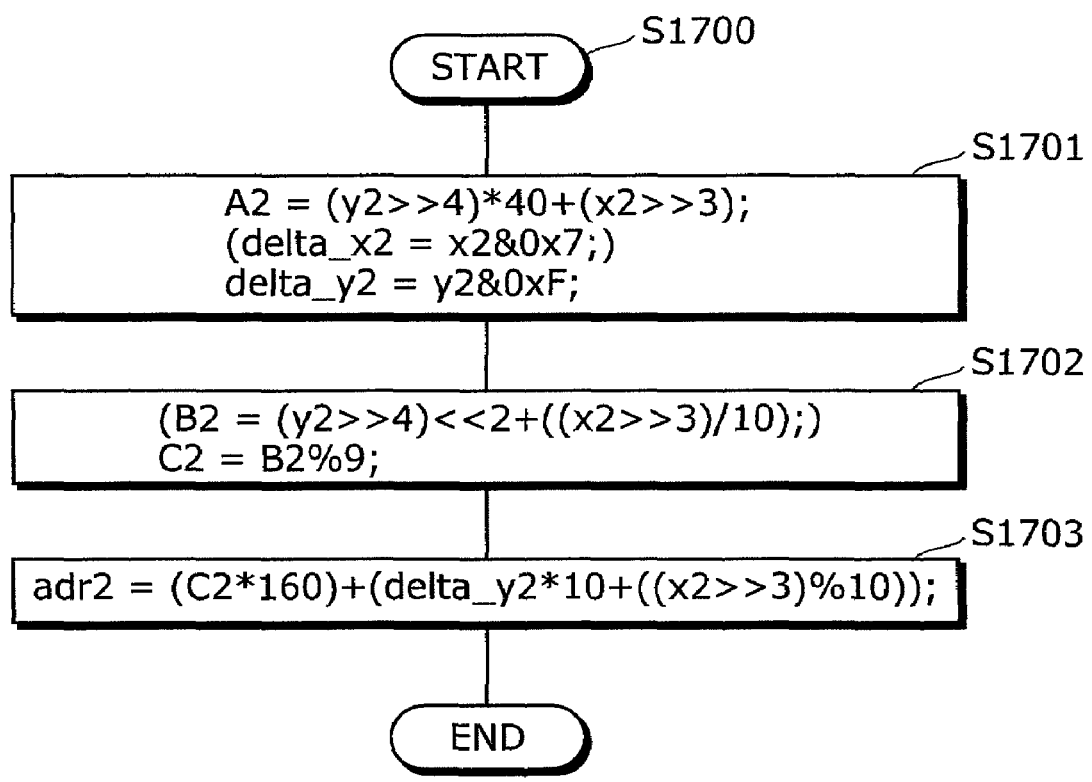
FIG. 17 is a flowchart of address conversion performed by the motion estimation device according to the second embodiment of the present invention.

FIG. 17 is a flowchart of the address conversion performed by the motion estimation device according to the second embodiment of the present invention. The following describes the address conversion according to the second embodiment with reference to the flowchart of FIG. 17.

The address conversion starts at Step S1700. Assuming that coordinates of a target virtual logical space position is (x2, y2), firstly A2 and relative coordinates (delta_x2, delta_y2) of the position in the small area SA are calculated according to the following equations 16 to 18 (Step S1701).

$$A2=(y2>>4)*40+(x2>>3) \quad \text{(equation 16)}$$

$$\text{delta}\_x2=x2\&0x7 \quad \text{(equation 17)}$$

$$\text{delta}\_y2=y2\&0xF \quad \text{(equation 18)}$$

Next, B2 and C2 are calculated according to the following equations 19 and 20 (Step S1702).

$$B2=(y2>>4)<<2+((x2>>3)/10) \quad \text{(equation 19)}$$

$$C2=B2\%9 \quad \text{(equation 20)}$$

Finally, a physical address adr2 is calculated according to the following equation 21 (Step S1703).

$$\text{adr2}=(C2*160)+(\text{delta}\_y2*10+((x2>>3)\%10) \quad \text{(equation 21)}$$

As described previously, by the reference memory control unit 812, the reference picture RfP is divided into segments, by dividing a width of the reference picture RfP into M widths, by setting a height of each divided segment to L pixels, and by setting a height of an area, which is transferred to the internal reference local memory 830, to vertically N segments. Furthermore, the virtual logical space of the cache memory 106 is divided into memory banks whose number is equal to or more than "M×(N−1)+1" and equal to or less than "M×N−1". The divided memory banks are managed in cycles by the FIFO method. In the above example, it is assumed that M=4, N=3, and the number of memory banks is 9.

In the first embodiment, the address conversion requires various operations, such as division and modulo operations in the equations 4 to 7, 13 and 14, and multiplication operations and conditional determination in the equations 8 and 9. In the second embodiment, however, the address conversion can be realized only by division and modulo operations using a width of a segment (10 words), a modulo operation using the number of managed segments (9 segments), and two multiplication operations, in the equations 19 to 21. Furthermore, a divisor in the division and modulo operations in the second embodiment is smaller than 88 that is the divisor in the first embodiment, so that it is possible to reduce a cost of circuit implementation.

Third Embodiment

The following describes processing performed in the internal reference memory 830 under the control of the reference memory control unit 812 according to the third embodiment.

Figure 18:
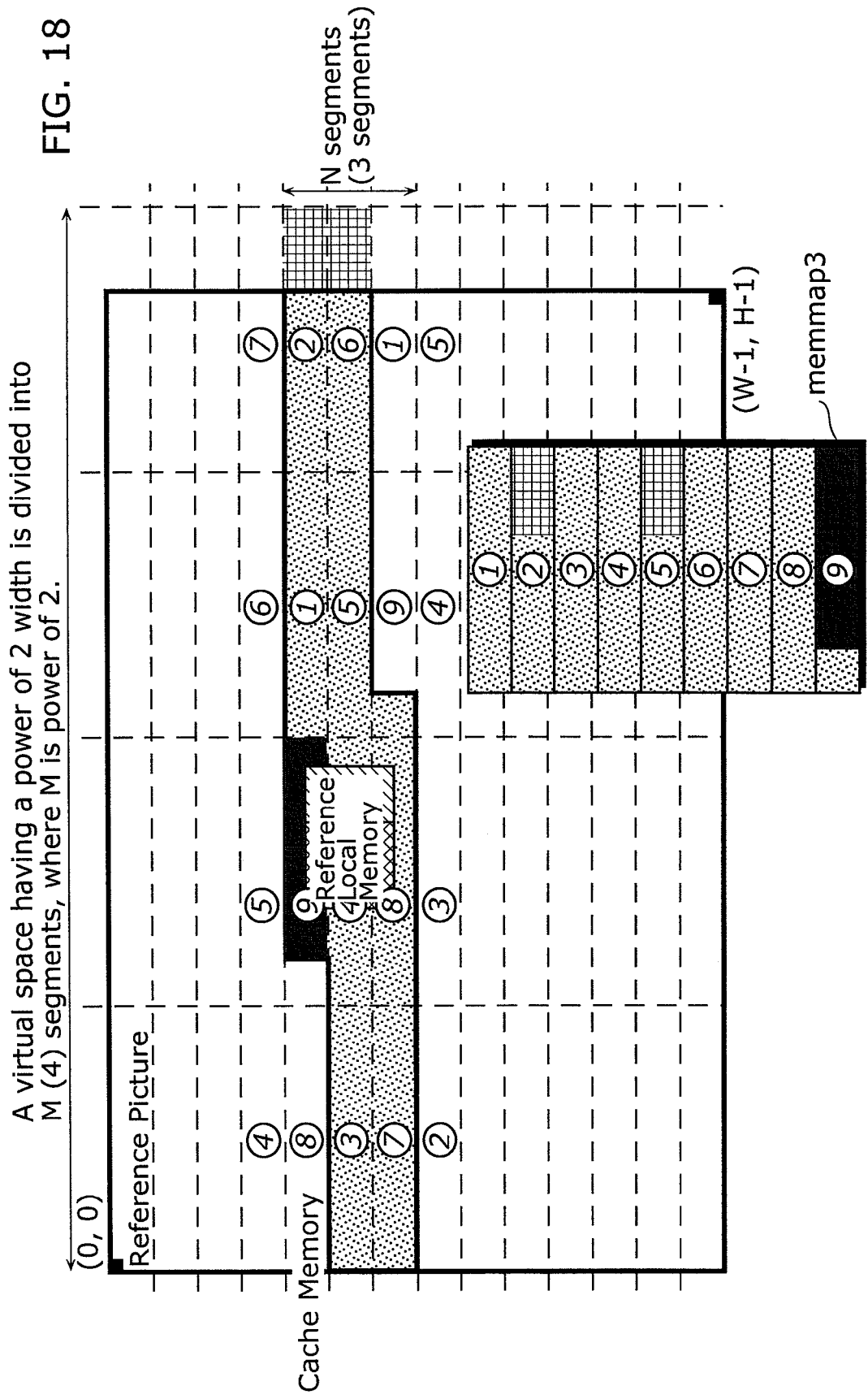
FIG. 18 is a schematic diagram showing a management area storing reference picture pixels used in a motion estimation device according to the third embodiment of the present invention.

FIG. 18 is a schematic diagram showing segments managed by the reference memory control unit 812, according to the third embodiment of the present invention. According to the third embodiment of the present invention, a virtual logical space of the cache memory 106, whose width is power of 2, is divided into segments. In more detail, a width of the virtual logical space is divided into M segments, where M is appropriate power of 2. A height of the virtual logical space is divided into segments each of which has the height L of the next renewed area ARenew. A height of the motion estimation range is set to N segments. These segments are managed in cycles by the FIFO method. Here, there is a possibility that there are invalid portions in managed segments at the top right of the reference picture RfP, since a width of each segment is power of 2. FIG. 18 shows a situation where segments 1 to 9 appear in the virtual logical space in cycles. A physical map memmap3 is a map on which the segments 1 to 9 are arranged. A thick-hatched portion in the segment 9 is overwritten by a thin-hatched portion. The segments 2 and 6 have areas in which no actual pixels exist, since the areas are located beyond the right edge of the reference picture RfP.

Figure 19:
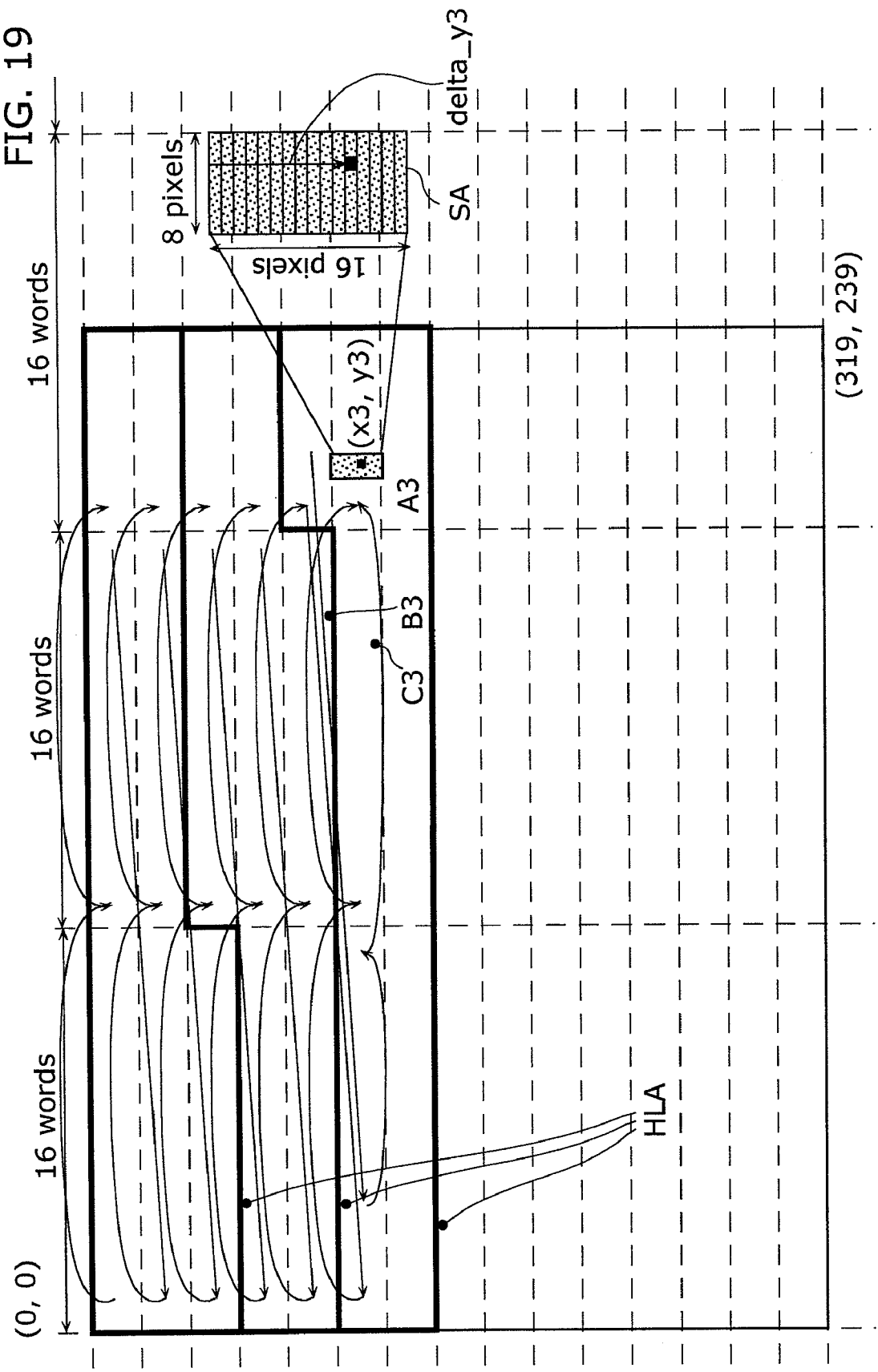
FIG. 19 is a schematic diagram showing positions of intermediate information of address conversion in the motion estimation device according to the third embodiment of the present invention.

A method of the address conversion according to the third embodiment is described in detail with reference to FIGS. 19 and 20. FIG. 19 is a schematic diagram showing positions of intermediate information of the address conversion performed by the motion estimation device according to the third embodiment of the present invention. For the sake of simplified explanation, FIG. 19 shows, like FIG. 7, the reference picture RfP as a QVGA picture of horizontal 320×vertical 240 pixels, where one word has 8 pixels. Here, a width of each managed segment is 16 words that is power of 2. Although the virtual logical space of the cache memory 106 has a width of 64 words (=2^6), actual pixels exist in first three segments whose total width is 48 words (=16×3).

The same reference characters in FIG. 13 are assigned to the identical elements in FIG. 19, so that the details of those elements are the same as described above. Here, A3 represents a position of a small area SA in a raster order of arranging small areas SA in the reference picture RfP from an original point at the top left of the reference picture RfP, assuming that each small area SA is (1 word)×(L pixels)=(8 pixels)×(16 pixels). B3 represents a position of the small area SA in a raster order of arranging small areas SA in an area HLA shown by a thick line, from the top left of the area HLA. C3 represents a position of the area HLA including the small area SA, among the areas HLA in the reference picture RfP.

Figure 20:
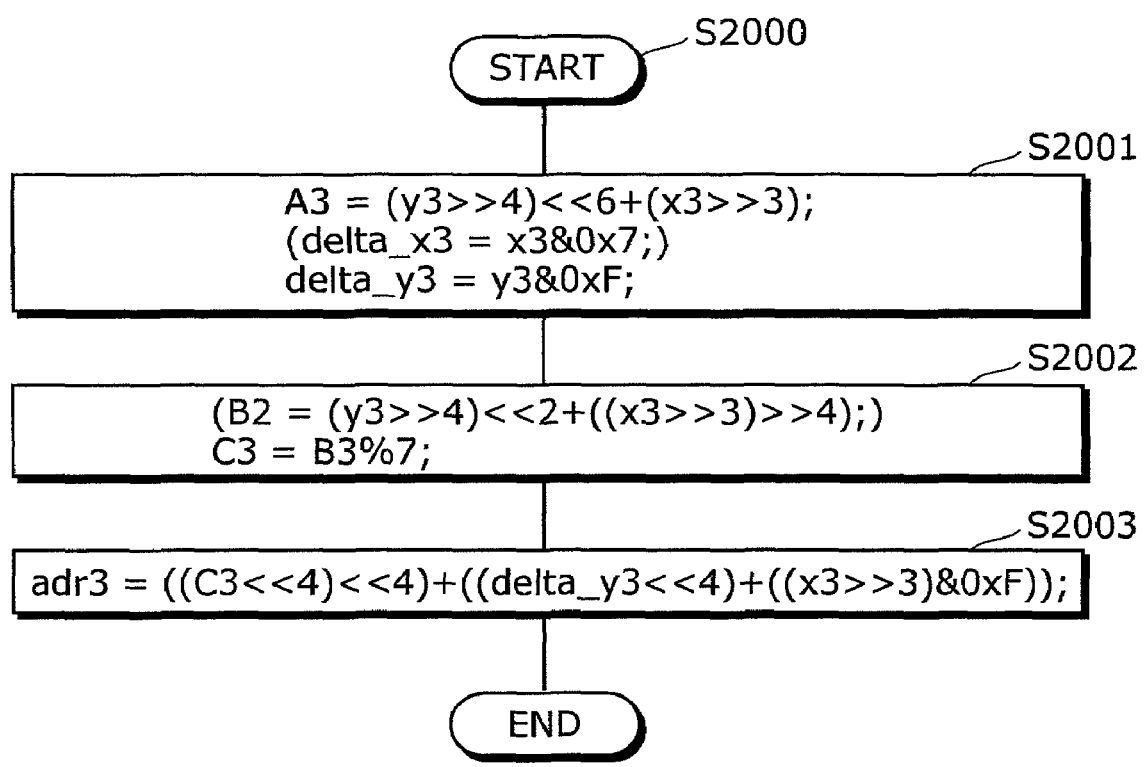
FIG. 20 is a flowchart of address conversion performed by the motion estimation device according to the third embodiment of the present invention.

FIG. 20 is a flowchart of the address conversion performed by the motion estimation device according to the third embodiment of the present invention. The following describes the address conversion according to the third embodiment with reference to the flowchart of FIG. 20.

The address conversion starts at Step S2000. Assuming that coordinates of a target virtual logical space position is (x3, y3), firstly A3 and relative coordinates (delta_x3, delta_y3) of the position in the small area SA are calculated according to the following equations 22 to 24 (Step S2001).

$$A3=(y3>>4)<<6+(x3>>3) \quad \text{(equation 22)}$$

$$\text{delta}\_x3=x3\&0x7 \quad \text{(equation 23)}$$

$$\text{delta}\_y3=y3\&0xF \quad \text{(equation 24)}$$

Next, B3 and C3 are calculated according to the following equations 25 and 26 (Step S2002).

$$B3=(y3>>4)<<2+((x2>>3)>>4) \quad \text{(equation 25)}$$

$$C3=B3\%7 \quad \text{(equation 26)}$$

Finally, a physical address adr3 is calculated according to the following equation 27 (Step S2003).

$$adr3=((C3<<4)<<4)+((delta\_y3<<4)+((x3>>3) \& 0xF)) \quad \text{(equation 27)}$$

As described above, by the reference memory control unit 812, the virtual logical space which has vertically power of 2 addresses and includes the reference picture RfP, into segments. That is, a width of the virtual logical space is divided into M (power of 2) segments, a height of each divided segment is set to L pixels, and a height of an area, which is transferred to the internal reference local memory 830, is set to vertically N segments. Furthermore, the cache memory 106 is divided into memory banks whose number is equal to or more than "M×(N−1)+1" and equal to or less than "M×N−1". The divided memory banks are managed in cycles by the FIFO method. In the above example, it is assumed that M=4, N=3, and the number of memory banks is 9.

In the second embodiment, the equations 19 to 21 in the address conversion need division and modulo operations using a width of a segment (10 words), a modulo operation using the number of managed segments (9 segments), and two multiplication operations. In the third embodiment, however, the operations such as division, modulo, and multiplication can be realized by bit shifting and bit masking, in the equations 25 and 27 except the equation 26. In the case of hardware implementation, addition operations in the equation 27 and the like can be realized only by bit AND. As a result, it is possible to reduce a cost of circuit implementation. Furthermore, in the case of software implementation, it is possible to significantly reduce the number of steps in the address conversion.

Fourth Embodiment

The following describes processing performed in the internal reference memory 830 under the control of the reference memory control unit 812 according to the fourth embodiment. When the motion estimation range used in the motion estimation unit 801 is located at edges of the reference picture RfP, it is necessary to change the management of areas in the cache memory 106.

FIGS. 21A and 21B are schematic diagrams each showing a structure of rectangular areas when the motion estimation range is positioned at edges of the reference picture RfP. In FIGS. 21A and 21B, a rectangular area ARect1L is a left part of the rectangular area ARect1 of FIG. 11, when the rectangular area ARect1 is divided into two parts at left and right edges of the reference picture RfP. A rectangular area ARect1R is a remaining right part of the divided rectangular area ARect1 of FIG. 11. A rectangular area ARect0 corresponds to the rectangular area ARect3 of FIG. 11 in a view of the rectangular area ARect1L, and also corresponds to the rectangular area ARect2 of FIG. 11 in a view of the rectangular area ARect1R. The rectangular area ARect0 is a sub memory area which is not yet used.

When the rectangular areas shown in FIGS. 11 and 12 are updated, if the rectangular area ARect1 arrives at the right edge of the reference picture RfP, a next renewed area ARenew is updated from an area which is at the left edge of the reference picture RfP and is positioned one area lower than the previous area. Therefore, as the coding proceeds, the situation is changed from FIG. 11, FIG. 12, and eventually to FIG. 21A, where motion estimation is performed in a motion estimation range ASrchR. Subsequently, when the center of the motion estimation is moved over the right edge of the reference picture RfP, the situation is changed to FIG. 21B, where motion estimation is performed in a motion estimation range ASrchL.

Fifth Embodiment

Figure 22:
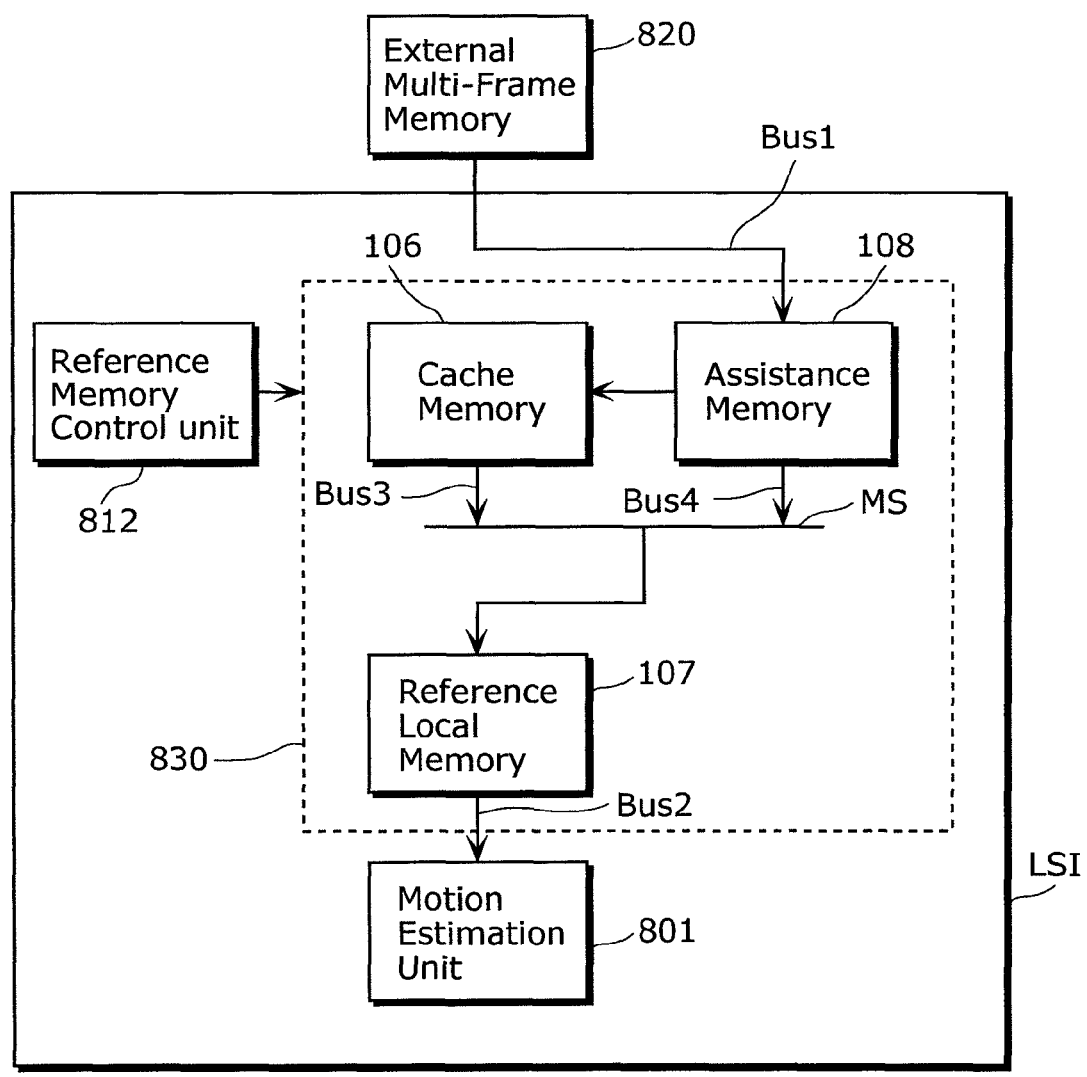
FIG. 22 is a block diagram showing a structure in which an inter-picture prediction coding device is connected with a frame memory, according to the fifth embodiment of the present invention.

The following describes the fifth embodiment of the present invention with reference to FIGS. 22 and 23.

FIG. 22 is a block diagram showing a structure in which an inter-picture prediction coding device is connected with an external frame memory, according to the fifth embodiment of the present invention. The same reference characters in FIG. 9 are assigned to the identical elements in FIG. 22, so that the details of those elements are the same as described above. The structure of FIG. 22 differs from the structure of FIG. 9 in that an assistance memory 108 is added in the internal reference memory 830, that the external connection bus Bus1 is connected to the assistance memory 108, that an internal bus is added to transfer data from the assistance memory 108 to the cache memory 106, and that an internal bus Bus3 from the cache memory 106 and an internal bus Bus4 from the assistance memory 108 are added to transfer image selected by the pixel selection unit MS to the reference local memory 107.

FIGS. 23A and 23B are schematic diagrams showing areas managed by the reference memory control unit 812, according to the fifth embodiment of the present invention. The managed areas store pixels of the reference picture RfP which are used in motion estimation. The same reference characters in FIG. 11 are assigned to the identical elements in FIGS. 23A and 23B, so that the details of those elements are the same as described above. In FIG. 23A, the rectangular area ARect1 is divided into upper and lower sub-areas which are an upper rectangular area ARect5 and a lower rectangular area ARect4. A height of the rectangular area ARect5 is the same as the height of the rectangular area ARect3. Furthermore, a rectangular area ARect6 is added to the structure of FIG. 11. FIG. 23B shows in which memory each of these rectangular areas is stored. The cache memory 106 stores the rectangular area ARect2, the rectangular area ARect5, and the rectangular area ARect3. The assistance memory 108 stores the rectangular area ARect4 and the rectangular area ARect6.

In this example, pixel data is processed in the following processing. Firstly, pixel data in an extended update area in the external multi-frame memory 820 is transferred and stored into the assistance memory 108 where the pixel data is managed by the FIFO method. The extended update area is obtained by extending the next renewed area ARenew downwards. By the FIFO management, old pixel data, which is in the rectangular area Arect4 at left having a height of L pixels and a width of K pixels, is to be deleted in the assistance memory 108, but among the to-be-deleted data, only data stored in the rectangular area ARect4 is inputted to the cache memory 106 and managed in the cache memory 106 by the FIFO method. Finally, data selected from the cache memory 106 or the assistance memory 108 is transferred and stored to the reference local memory 107 via the pixel selection unit MS, and used for motion estimation by the motion estimation unit 801.

With the above structure and processing, in physical address management in the cache memory 106, a memory amount of (width of reference picture W)×(height of motion estimation range J−height of next renewed area L) is able to be managed by the FIFO method. Thereby, it is possible to prevent deviation of positions where addresses are physically allocated in cycles, which results in easy implementation of the internal reference memory 830. On the other hand, in physical address management in the assistance memory 108, like segments described in the second and third embodiments, the implementation becomes easy by managing segments obtained by dividing a width of the reference picture into power of 2 segments, or by setting the width of the reference picture to power of 2. Further, although an amount of pixels transferred from the external multi-frame memory 820 is increased, the addition of the rectangular area ARect6 makes it possible to extend the motion estimation range in a vertical direction, without significant increase of embedded memory amount. As another application, the present invention can be easily applied to Macroblock-Adaptive Frame-Field (MBAFF) coding of H.264 standard, which is a tool of coding a pair of adjacent upper-lower macroblocks, by adding an area having a height of one macroblock as the rectangular area ARec6.

Sixth Embodiment

Figure 24:
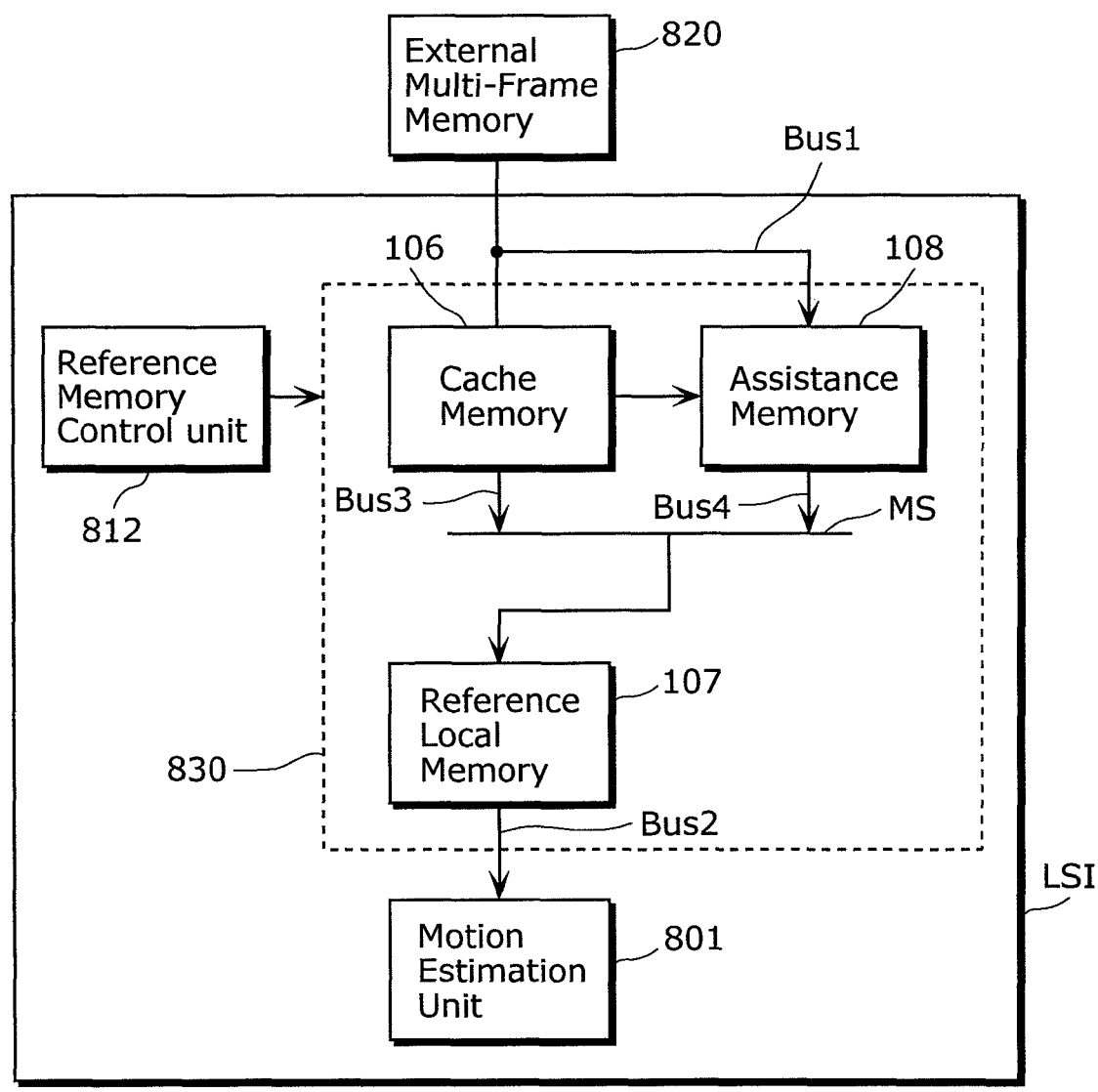
FIG. 24 is a block diagram showing a structure in which an inter-picture prediction coding device is connected with a frame memory, according to the sixth embodiment of the present invention.

The following describes the sixth embodiment of the present invention with reference to FIGS. 24 to 26.

FIG. 24 is a block diagram showing a structure in which an inter-picture prediction coding device is connected with an external frame memory, according to the sixth embodiment of the present invention. The same reference characters in FIG. 9 are assigned to the identical elements in FIG. 24, so that the details of those elements are the same as described above. The structure of FIG. 24 differs from the structure of FIG. 9 in that an assistance memory 108 is added in the internal reference memory 830, that the external connection bus Bus1 is connected to the cache memory 106 and the assistance memory 108, that an internal bus is added to transfer data from the cache memory 106 to the assistance memory 108, and that an internal bus Bus3 from the cache memory 106 and an internal bus Bus4 from the assistance memory 108 are added to transfer image selected by the pixel selection unit MS to the reference local memory 107.

Figure 25A:
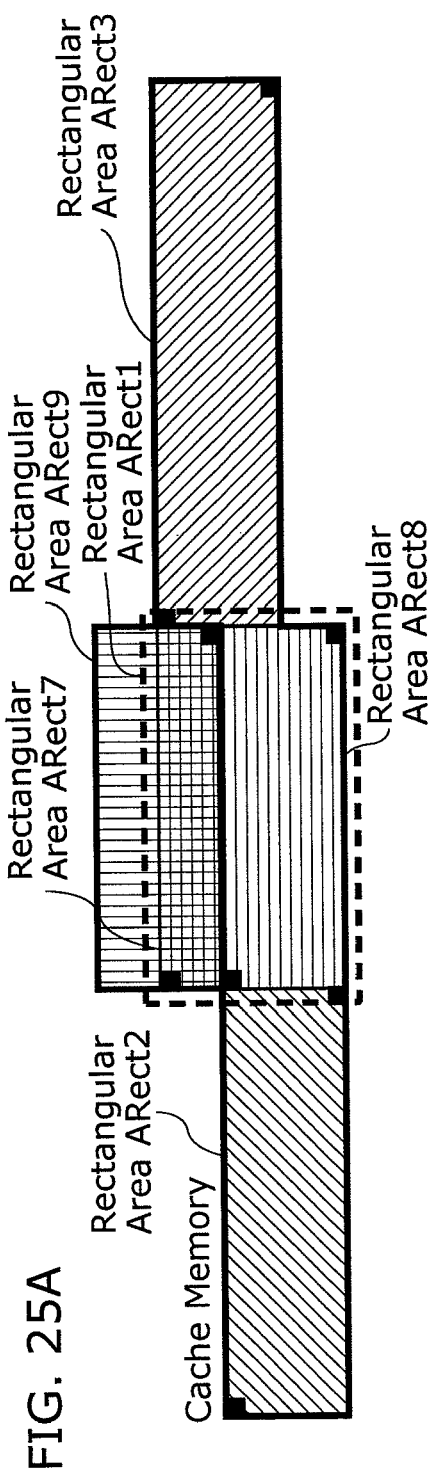
FIGS. 25A and 25B are schematic diagrams showing managed areas for storing pixels of a reference picture used in a motion estimation device according to the sixth embodiment of the present invention.
Figure 25B:
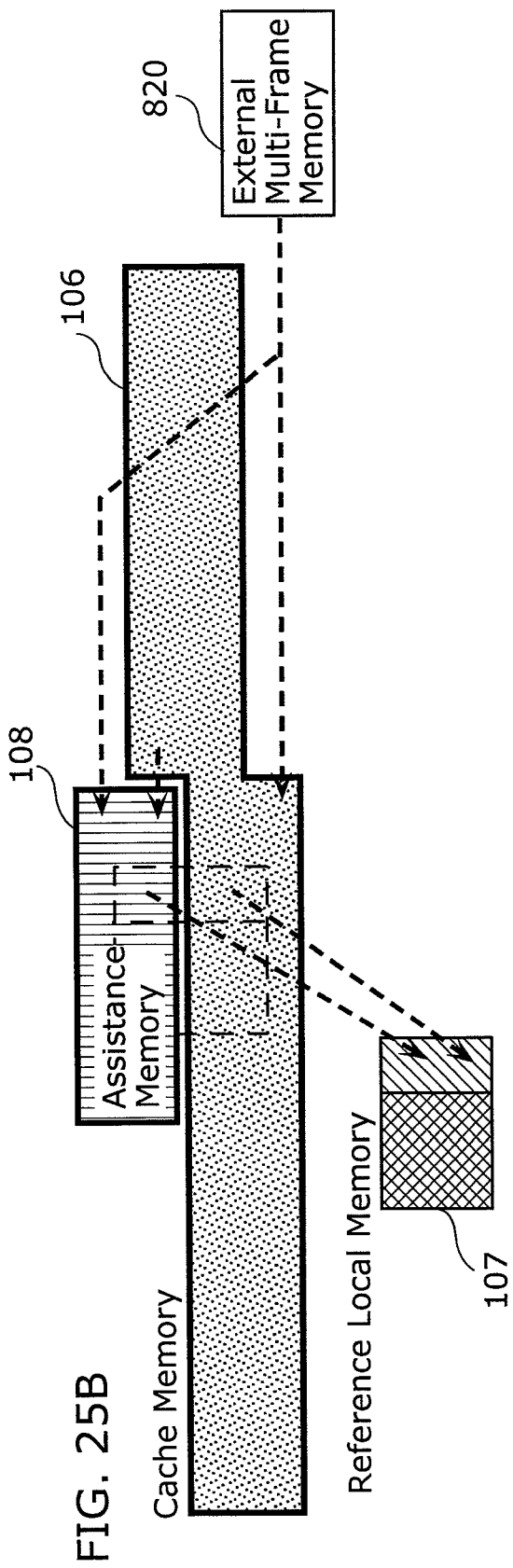

FIGS. 25A and 25B are schematic diagrams showing areas managed by the reference memory control unit 812, according to the sixth embodiment of the present invention. The managed areas store pixels of the reference picture RfP which are used in motion estimation. The same reference characters in FIG. 11 are assigned to the identical elements in FIGS. 25A and 25B, so that the details of those elements are the same as described above. In FIG. 25A, the rectangular area ARect1 is divided into upper and lower sub-areas which are an upper rectangular area ARect7 and a lower rectangular area ARect8. A height of the rectangular area ARect8 is the same as the height of the rectangular area ARect2. Furthermore, a rectangular area ARect9 is added to the structure of FIG. 11. FIG. 25B shows in which memory each of these rectangular areas is stored. The cache memory 106 stores the rectangular area ARect2, the rectangular area ARect8, and the rectangular area ARect3. The assistance memory 108 stores the rectangular area ARect7 and the rectangular area ARect9.

In this example, pixel data is processed in the following processing. Firstly, pixel data is transferred and stored from the external multi-frame memory 820 into the cache memory 106 where the pixel data is managed by the FIFO method. By the FIFO management, old pixel data in the cache memory 106, which is in the rectangular area ARect3 at top left having a height of L pixels and a width of K pixels, is to be deleted, but the to-be-deleted data is inputted to the assistance memory 108 and managed in the assistance memory 108 by the FIFO method. At the same time, it is possible to transfer pixel data required to extend the motion estimation range, from the external multi-frame memory 820 to the assistance memory 108 as data in the rectangular area ARect9. Finally, data is selected from the cache memory 106 or the assistance memory 108 to be transferred and stored to the reference local memory 107 via the pixel selection unit MS, and used for motion estimation by the motion estimation unit 801.

With the above structure and processing, in physical address management in the cache memory 106, a memory amount of (width of reference picture W)×(height of motion estimation range J–height of next renewed area L) is able to be managed by the FIFO method. Thereby, it is possible to prevent deviation of positions where addresses are physically allocated in cycles, which results in easy implementation of the internal reference memory 830. On the other hand, in physical address management in the assistance memory 108, like segments described in the second and third embodiments, the implementation becomes easy by managing segments obtained by dividing a width of the reference picture into power of 2 segments, or by setting the width of the reference picture to power of 2. Further, although an amount of pixels transferred from the external multi-frame memory 820 is increased, the addition of the rectangular area ARect9 makes it possible to extend the motion estimation range in a vertical direction, without significant increase of embedded memory amount. As another application, the present invention can be easily applied to the MBAFF coding of H.264 standard, which is a tool of coding a pair of adjacent upper-lower macroblocks, by adding an area having a height of one macroblock as the rectangular area ARec9.

Figure 26A:
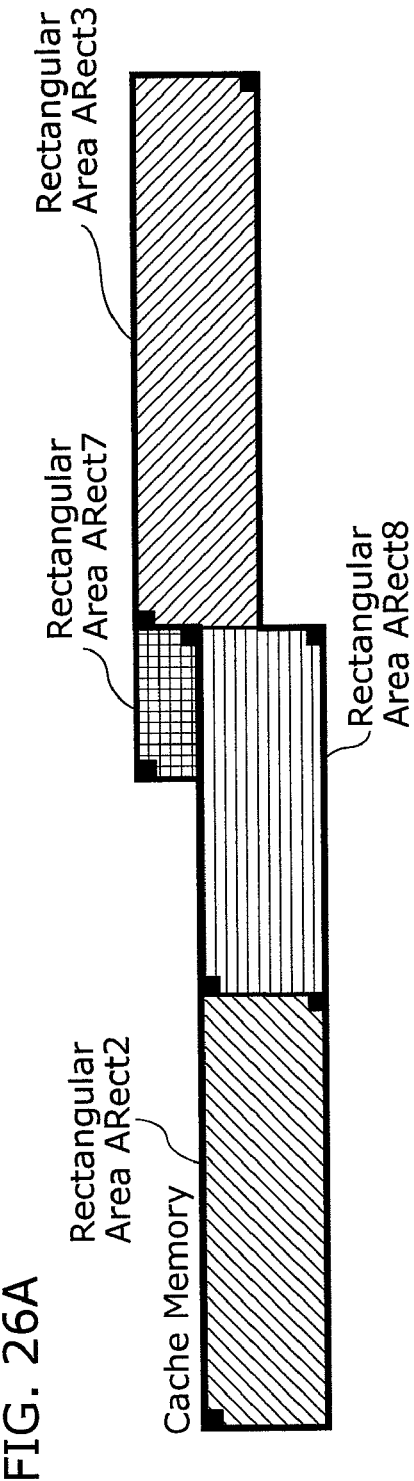
FIGS. 26A and 26B are schematic diagrams showing variations of managed areas storing pixels of a reference picture used in a motion estimation device according to the sixth embodiment of the present invention.
Figure 26B:
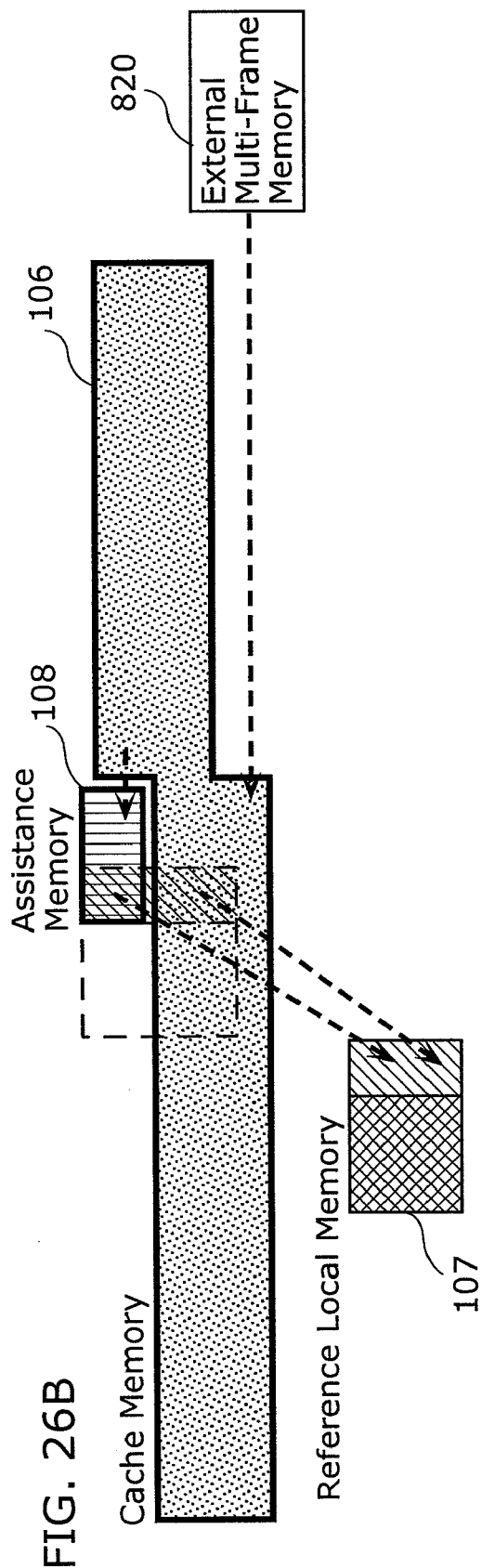

Moreover, reduction of the memory capacity is realized by the following structure. FIGS. 26A and 26B are schematic diagrams showing variations of managed areas storing pixels of the reference picture used in the motion estimation device according to the sixth embodiment of the present invention. The same reference characters in FIGS. 25A and 25B are assigned to the identical elements in FIGS. 26A and 26B, so that the details of those elements are the same as described above. The structures shown in FIGS. 26A and 26B differ from the structures shown in FIGS. 25A and 25B in that the rectangular area ARect9 for extending the motion estimation range in the assistance memory 108 is eliminated, that a width of the rectangular area ARect7 is shortened to be used as a small buffer for temporarily storing data until the data is transferred to the reference local memory 107. Into the assistance memory 108, pixel data included in the motion estimation range and pixel data included in the update range are transferred from cache memory 106. The transferred pixel data is among the rectangular areas ARect7 and ARect8. The reference memory control unit 812 manages the assistance memory 108 by the FIFO method, in which pixel data of the update range is a last pixel data. With the structure in which the internal reference memory 830 has the reference local memory 107 which is directly used by the motion estimation unit 801, and the cache memory 106 and the assistance memory 108 which are used as sub memory areas, it is possible to easily manage the physical addresses, thereby reducing the memory capacity at minimum.

Seventh Embodiment

Figure 27:
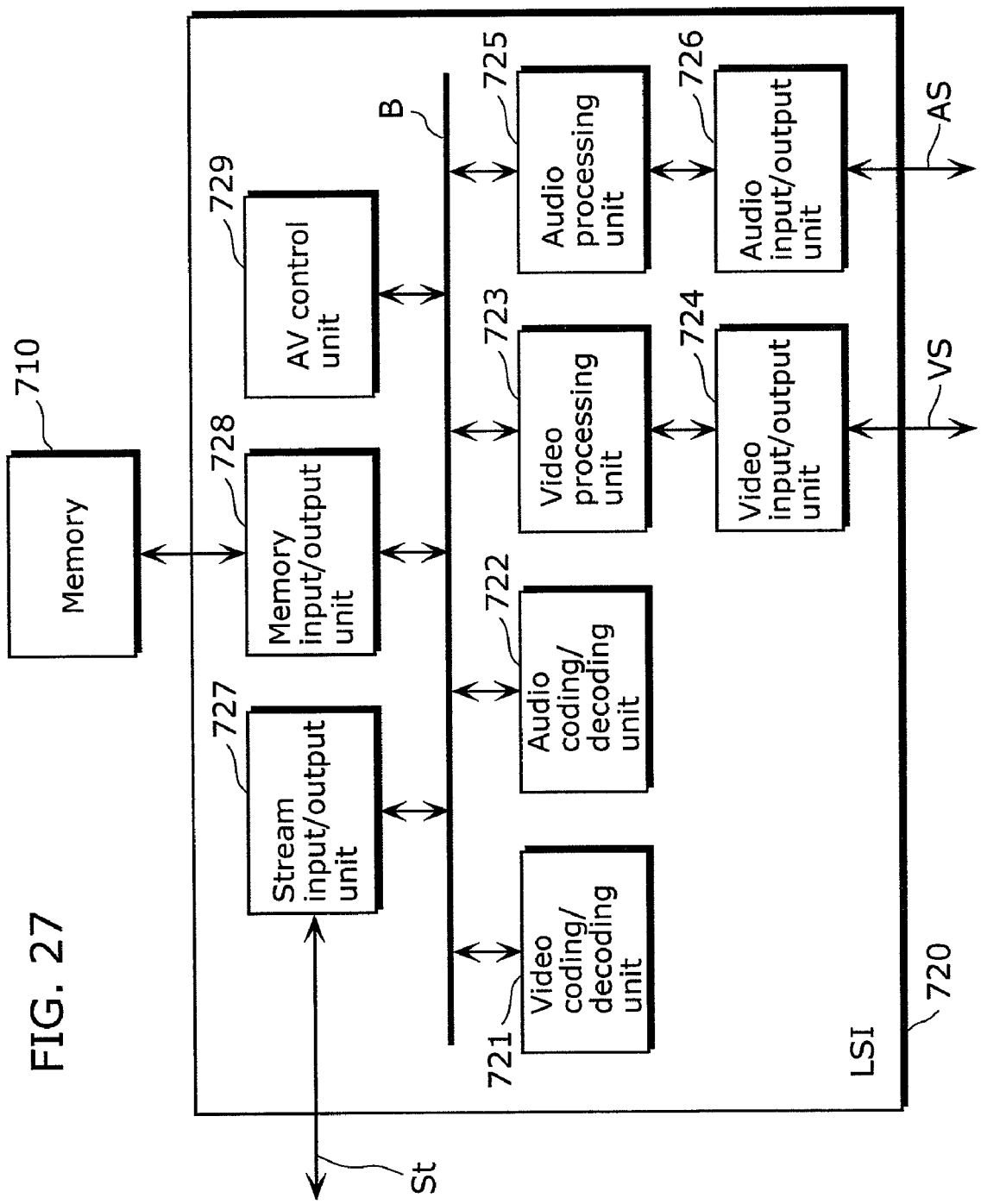
FIG. 27 is a block diagram showing a structure of an AV processing unit realizing a H.264 recorder.

The following describes an application of the inter-picture prediction coding device described in the above embodiments. FIG. 27 is a block diagram showing an AV processing apparatus which realizes an H.264 recorder.

An AV processing apparatus 700 is a processing unit configured as a DVD recorder, a hard disk recorder, and the like which reproduces digital-compressed audio and video. As shown in FIG. 27, the AV processing apparatus 700 includes a stream input/output unit 727, a memory input/output unit 728, an AV control unit 729, a video coding/decoding unit 721, an audio coding/decoding unit 722, a video processing unit 723, a video input/output unit 724, an audio processing unit 725, an audio input/output unit 726, and a bus B.

The stream input/output unit 727 is connected to the bus B in order to input and output audio and video stream data St via the bus B. The video coding/decoding unit 721 is connected to the bus B and performs coding and decoding of video. The audio coding/decoding unit 722 is connected to the bus B and performs coding and decoding of audio. The memory input/output unit 728 is connected to the bus B and serves as an input/output interface of a data signal to a memory 710. Here, the memory 710 is a memory into which data such as stream data, coded data, and decoded data are stored. The memory 710 includes a region of the external multi-frame memory shown in FIG. 8.

The video processing unit 723 is connected to the bus B and performs pre-processing and post-processing on a video signal. The video input/output unit 724 outputs, to the outside, as a video input/output signal VS, the video signal which has processed by the video processing unit 723 or which has passed through the video processing unit 723 without being processed by the video processing unit 723, or captures a video input/output signal VS from the outside.

The audio processing unit 725 is connected to the bus B, and performs pre-processing and post-processing on an audio signal. The audio input/output unit 726 outputs, to the outside, as an audio input/output signal AS, the audio signal which has processed by the audio processing unit 725 or which has passed through the audio processing unit 725 without being processed by the audio processing unit 725, or captures an audio input/output signal AS from the outside.

The AV control unit 729 controls the entire AV processing unit 700. The bus B is used for transferring data such as stream data and decoded data of audio/video.

The following describes only coding processing performed by the above-structured AV processing apparatus 700 with reference to FIG. 27. Firstly, a video signal VS is inputted to the video input/output unit 724, and an audio signal AS is inputted to the audio input/output unit 726. Next, the video processing unit 723 performs filtering, characteristic amount extraction for coding and the like on the video signal VS inputted to the video input/output unit 724, and stores the processed video signal VS into the memory 710 via the memory input/output unit 728 as an original picture. Then, the video coding/decoding unit 721 obtains the original picture and a reference picture from the memory 710 via the memory input/output unit 728, and transmits, to the memory 710, the video stream data coded by the video coding/decoding unit 721 and local decoded data.

Here, the picture coding/decoding unit 721 includes almost of constituent elements in FIG. 8. The video stream corresponds to the coded signal Str in FIG. 8 and the memory 710 includes a region of the external multi-frame memory 820 of FIG. 8.

On the other hand, the audio processing unit 725 performs filtering, characteristic amount extraction for coding and the like on the audio signal AS inputted to the audio input/output unit 726, and stores the processed audio signal AS into the memory 710 as original audio data, through the memory input/output unit 728. Next, the original audio data is obtained again from the memory 710 via the memory input/output unit 728, and stores the resultant into the memory 710 again as audio stream data.

Finally, the video stream data, the audio stream data and other stream information are processed as one stream data St, and the stream data St is outputted through the stream input/output unit 727. Such stream data St is then written onto a recording medium such as an optical disk or a hard disk.

Note also that functional blocks in the block diagrams shown in FIGS. 8, 27, and the like are implemented into a LSI which is an integrated circuit. These may be integrated separately, or a part or all of them may be integrated into a single chip. (For example, functional blocks except a memory may be integrated into a single chip.) Since the external multi-frame memory 820 of FIGS. 8, 9, 22 and 24 and the memory 710 of FIG. 27 need to hold a large amount of data, these memories are generally implemented as external large-capacity DRAM or the like outside the LSI. However, with the future progress of technologies, there is a possibility that these memories will be also integrated into a single package or a single chip.

Here, the integrated circuit is referred to as a LSI, but the integrated circuit can be called an IC, a system LSI, a super LSI or an ultra LSI depending on their degrees of integration. Note also that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured. Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

Although only some exemplary embodiments of the present invention have been described in detail above, those skilled in the art will be readily appreciate that many modifications are possible in is the exemplary embodiments without materially departing from the novel teachings and advantages of the present invention. Accordingly, all such modifications are intended to be included within the scope of the present invention.

INDUSTRIAL APPLICABILITY

The motion estimation device according to the present invention can reduce a cost of increasing embedded internal reference memory, significantly reduce a transfer amount of pixels of a reference picture used in motion estimation, and also reduce an amount of circuit implemented in the reference memory control unit. The present invention is suitable to realize DVD recorders, hard disk recorders, camcorders, and the like, which treat large-sized image using H.264 standard.

What is claimed is:

1. A motion estimation device which estimates motion of each block in a picture, said motion estimation device comprising:
   a storage operable to store a reference picture;
   a reference memory operable to store pixel data included in a transferred area of the reference picture, the pixel data being transferred from said storage;
   a motion estimator operable to estimate motion of a target block, for which motion estimation is performed, using pixel data in a motion estimation range included in the transferred area stored in said reference memory; and
   a memory controller operable to update a part of the transferred area for use in a next target block,
   wherein the transferred area includes first to third rectangular areas,
   the first rectangular area includes the motion estimation range,
   the second rectangular area has a width that is from (i) a left-most pixel in the reference picture to (ii) a pixel on immediately left of a left-most pixel in the first rectangular area, a height that is L pixels lower than a height of the first rectangular area, and a bottom that is positioned at a same horizontal level as a bottom of the first rectangular area, the third rectangular area has a width that is from (i) a right-most pixel in the reference picture to (ii) a pixel on immediately right of a right-most pixel in the first rectangular area, a height that is L pixels lower than the height of the first rectangular area, and an upper limit that is positioned at a same horizontal level as an upper limit of the first rectangular area, L is expressed by power of 2, and said memory controller is operable to transfer pixel data from an update area in said storage to a memory area in said reference memory, the update area being positioned on immediately right of the first rectangular area and immediately under the third rectangular area and having a height of L pixels and a width of K pixels, and the memory area being positioned in the first rectangular area at top left and having a height of L pixels and a width of K pixels.

2. The motion estimation device according to claim 1, wherein coordinates of a pixel at top left of the reference picture stored in said storage are (0, 0), the reference picture having a height of H pixels and a width of W pixels, coordinates of a pixel at top left of the first rectangular area corresponding to the target block are (X, Y), the first rectangular area having a height of J pixels and a width of I pixels, coordinates of a pixel at top left of the second rectangular area corresponding to the target block are (0, Y+L), coordinates of a pixel at bottom right of the second rectangular area corresponding to the target block are (X−1, Y+J−1), coordinates of a pixel at top left of the third rectangular area corresponding to the target block are (X+I, Y), and coordinates of a pixel at bottom right of the third rectangular area corresponding to the target block are (W−1, Y+J−L−1).

3. The motion estimation device according to claim 2, wherein said memory controller is operable, by transferring the pixel data from the update area in said storage to the memory area in said reference memory for the next target block, the memory area storing the pixel data, having a height of L pixels and a width of K pixels, and having coordinates of a top left pixel, which is the top left pixel in the first rectangular area, as (X, Y), and coordinates of a bottom right pixel as (X+K, Y+L), to:

update, for the next target block, the coordinates of the pixel at top left of the first rectangular area to (X+K, Y) and the coordinates of the pixel at bottom right of the first rectangular area to (X+I+K−1, Y+J−1);

update, for the next target block, the coordinates of the pixel at top left of the second rectangular area to (0, Y+L) and the coordinates of the pixel at bottom right in the second rectangular area to (X+K−1, Y+J−1); and update, for the next target block, the coordinates of the pixel at top left in the third rectangular area to (X+K+1, Y) and the coordinates of the pixel at bottom right in the third rectangular area to (W−1, Y+J−L−1).

4. The motion estimation device according to claim 1, wherein said reference memory includes:

a first memory operable to store pixel data included in the first to third rectangular areas; and a second memory operable to store pixel data included in the motion estimation range in the first rectangular area, the pixel data being transferred from said first memory, said memory controller is operable to transfer the pixel data included in the motion estimation range from said first memory to said second memory, and said motion estimator is operable to obtain the pixel data from said second memory and estimate the motion of the target block.

5. The motion estimation device according to claim 1, wherein said memory controller is operable to:

divide the first rectangular area into a first right rectangular area and a first left rectangular area, when a right edge of the first rectangular area is positioned beyond a right edge of the reference picture during processing of the motion estimation, (i) the first right rectangular area including the right edge of the reference picture, and (ii) the first left rectangular area including a left edge of the reference picture and being positioned L pixels lower than the first right rectangular area;

combine the second and third rectangular areas into one rectangular area, when the first rectangular area is divided, (iii) the combined rectangular area being sandwiched in a horizontal direction between the first right rectangular area and the first left rectangular area, (iv) a bottom of the combined rectangular area being at same horizontal level as a bottom of the first right rectangular area, and (v) an upper limit of the combined rectangular area being at same horizontal level as an upper limit of the first right rectangular area; and set the motion estimation range to an area included in one of the first right rectangular area and the first left rectangular area, without dividing the motion estimation range.

6. The motion estimation device according to claim 1, wherein said memory controller is operable to:

convert a logical address expressed by coordinates (X, Y) of the reference picture into a physical address allocated in a raster direction; and manage said reference memory by a first in first out (FIFO) method in the transferring from said storage to said reference memory.

7. The motion estimation device according to claim 6, wherein said memory controller is operable to:

divide the reference picture, by vertically dividing the reference picture into equal M columns, horizontally dividing the reference picture into rows each having a height of L pixels, and setting a height of the transferred area to N rows; and divide said reference memory into memory banks whose number is equal to or more than "M×(N−1)+1" and equal to or less than "M×N−1", and manage the divided memory banks in cycles by the FIFO method.

8. The motion estimation device according to claim 6, wherein said memory controller is operable to:

divide a virtual space, which includes the reference picture and has power of 2 addresses in a horizontal direction, by vertically dividing the virtual space into equal M columns, where M is expressed by power of 2, horizontally dividing the virtual space into rows each having a height of L pixels, and setting a height of the transferred area to N rows; and divide said reference memory into memory banks whose number is equal to or more than "M×(N−1)+1" and equal to or less than "M×N−1", and manage the divided memory banks in cycles by the FIFO method.

9. The motion estimation device according to claim 1, wherein the first rectangular area includes a fourth rectangular area and a fifth rectangular area, the fourth rectangular area having a height of L pixels from a bottom of the first rectangular area, and the fifth rectangular area being an area other than the fourth rectangular area, said reference memory includes a first memory and an assistance memory, said first memory is operable to store the fifth rectangular area, the second rectangular area, and the third rectangular area by a FIFO method, said assistance memory is operable to store the fourth rectangular area by the FIFO method, and said memory controller is operable, for the next target block, to: (i) transfer pixel data from said assistance memory to said first memory, the pixel data being included in an area having a height of L pixels and a width of K pixels positioned in the fourth rectangular area at left; and (ii) transfer pixel data in the update area from said storage to said assistance memory by the FIFO method.

10. The motion estimation device according to claim 9,
wherein said assistance memory is operable to store a sixth rectangular area immediately under the fourth rectangular area, a width of the sixth rectangular area being same as a width of the fourth rectangular area, said memory controller is operable, for the next target block, to: transfer pixel data from said assistance memory to said first memory, the pixel data being included in an area having a height of L pixels and a width of K pixels positioned in the fourth rectangular area at left; and transfer both of the fourth rectangular area and the sixth rectangular area from said storage to said assistance memory by the FIFO method; and transfer pixel data in an extended update area from said storage to said assistance memory, the extended update area being obtained by extending said update area downwards, and said motion estimator is operable to perform motion estimation using the fourth rectangular area, the fifth rectangular area, and the sixth rectangular area.

11. The motion estimation device according to claim 1,
wherein the first rectangular area includes a seventh rectangular area and an eighth rectangular area, the seventh rectangular area having a height of L pixels from an upper limit of the first rectangular area, and the eighth rectangular area being an area other than the seventh rectangular area, said reference memory includes a first memory and an assistance memory, said first memory is operable to store the eighth rectangular area, the second rectangular area, and the third rectangular area by a first in first out (FIFO) method, said assistance memory is operable to store the seventh rectangular area by the FIFO method, and said memory controller is, for the next target block, operable to: (i) transfer pixel data from said first memory to said assistance memory, the pixel data being included in an area having a height of L pixels and a width of K pixels positioned in the third rectangular area at left; and (ii) transfer pixel data in the update area from said storage to said first memory by the FIFO method.

12. The motion estimation device according to claim 11,
wherein said assistance memory is operable to store a ninth rectangular area on the seventh rectangular area, a width of the ninth rectangular area being same as a width of the seventh rectangular area, said memory controller is, for the next target block, operable to: transfer pixel data from said first memory to said assistance memory, the pixel data being included in an area having a height of L pixels and a width of K pixels positioned in the third rectangular area at left; manage both of the seventh rectangular area and the ninth rectangular area in said assistance memory by the FIFO method; and transfer pixel data the update area from said storage to said first memory, and said motion estimator is operable to perform motion estimation using the seventh rectangular area, the eighth rectangular area, and the ninth rectangular area.

13. The motion estimation device according to claim 11,
wherein said reference memory includes a second reference memory, to which (i) pixel data included in the motion estimation range and (ii) pixel data included in an update range added to the motion estimation range, the update range having pixels of a width of K pixels on immediately right to the motion estimation range, among the seventh rectangular area and the eighth rectangular area stored in said assistance memory and said first memory, are transferred, said motion estimator is operable to estimate motion of the target block using pixel data of the reference picture, the pixel data being obtained from said second reference memory, and said memory controller is operable to manage said assistance memory by the FIFO method, in which pixel data of the update range is a last pixel data.

14. A motion estimation method of estimating motion of each block in a picture, said motion estimation method comprising:

transferring pixel data from a storage to a reference memory, the storage storing a reference picture, and the pixel data being included in a transferred area of the reference picture;

estimating motion of a target block, for which motion estimation is performed, using pixel data in a motion estimation range included in the transferred area stored in the reference memory; and updating a part of the transferred area for use in a next target block, wherein the transferred area includes first to third rectangular areas, the first rectangular area includes the motion estimation range, the second rectangular area has a width that is from (i) a left-most pixel in the reference picture to (ii) a pixel on immediately left of a left-most pixel in the first rectangular area, a height that is L pixels lower than a height of the first rectangular area, and a bottom that is positioned at a same horizontal level as a bottom of the first rectangular area, the third rectangular area has a width that is from (i) a right-most pixel in the reference picture to (ii) a pixel on immediately right of a right-most pixel in the first rectangular area, a height that is L pixels lower than the height of the first rectangular area, and an upper limit that is positioned at a same horizontal level as an upper limit of the first rectangular area, L is expressed by power of 2, and in said updating, pixel data is transferred from an update area in the storage to a memory area in the reference memory, the update area being positioned on immediately right of the first rectangular area and immediately under the third rectangular area and having a height of L pixels and a width of K pixels, the memory area being positioned in the first rectangular area at top left and having a height of L pixels and a width of K pixels.

15. An integrated circuit which estimates motion of each block in a picture, said integrated circuit comprising:

a reference memory operable to store pixel data included in a transferred area of a reference picture, the pixel data being transferred from an external storage storing the reference picture;

a motion estimator operable to estimate motion of a target block, for which motion estimation is performed, using pixel data in a motion estimation range included in the transferred area stored in said reference memory; and a memory controller operable to update a part of the transferred area for use in a next target block, wherein the transferred area includes first to third rectangular areas, the first rectangular area includes the motion estimation range, the second rectangular area has a width that is from (i) a left-most pixel in the reference picture to (ii) a pixel on immediately left of a left-most pixel in the first rectangular area, a height that is L pixels lower than a height of the first rectangular area, and a bottom that is positioned at a same horizontal level as a bottom of the first rectangular area, the third rectangular area has a width that is from (i) a right-most pixel in the reference picture to (ii) a pixel on immediately right of a right-most pixel in the first rectangular area, a height that is L pixels lower than the height of the first rectangular area, and an upper limit that is positioned at a same horizontal level as an upper limit of the first rectangular area, L is expressed by power of 2, and said memory controller is operable to transfer pixel data from an update area in the external storage to a memory area in said reference memory, the update area being positioned on immediately right of the first rectangular area and immediately under the third rectangular area and having a height of L pixels and a width of K pixels, the memory area being positioned in the first rectangular area at top left and having a height of L pixels and a width of K pixels.

16. An image coding device which estimates motion of each block in a picture and codes an image based on the motion, said image coding device comprising:

a storage operable to store a reference picture;

a reference memory operable to store pixel data included in a transferred area of the reference picture, the pixel data being transferred from said storage;

a motion estimator operable to estimate motion of a target block, for which motion estimation is performed, using pixel data in a motion estimation range included in the transferred area stored in said reference memory; and a memory controller operable to update a part of the transferred area for use in a next target block, wherein the transferred area includes first to third rectangular areas, the first rectangular area includes the motion estimation range, the second rectangular area has a width that is from (i) a left-most pixel in the reference picture to (ii) a pixel on immediately left of a left-most pixel in the first rectangular area, a height that is L pixels lower than a height of the first rectangular area, and a bottom that is positioned at a same horizontal level as a bottom of the first rectangular area, the third rectangular area has a width that is from (i) a right-most pixel in the reference picture to (ii) a pixel on immediately right of a right-most pixel in the first rectangular area, a height that is L pixels lower than the height of the first rectangular area, and an upper limit that is positioned at a same horizontal level as an upper limit of the first rectangular area, L is expressed by power of 2, and said memory controller is operable to transfer pixel data from an update area in said storage to a memory area in said reference memory, the update area being positioned on immediately right of the first rectangular area and immediately under the third rectangular area and having a height of L pixels and a width of K pixels, and the memory area being positioned in the first rectangular area at top left and having a height of L pixels and a width of K pixels.

\* \* \* \* \*